April 4, 1961  V. D. HERY  2,977,860
MACHINE FOR PRODUCING CONTAINERS
Filed June 4, 1957  16 Sheets-Sheet 1
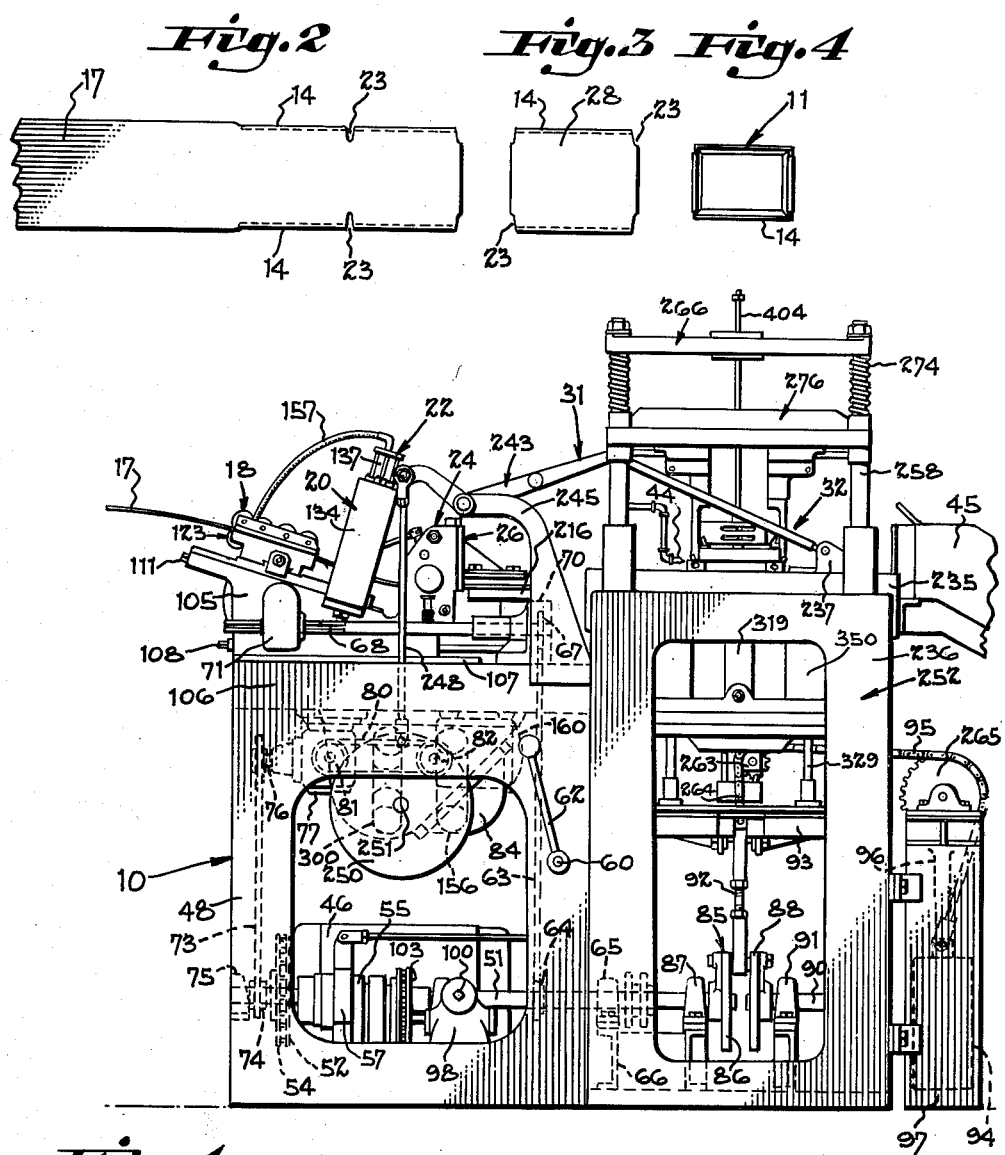
INVENTOR.
Vincent D. Hery.
BY
Wood, Herron & Evans,
ATTORNEYS.

April 4, 1961  V. D. HERY  2,977,860
MACHINE FOR PRODUCING CONTAINERS
Filed June 4, 1957  16 Sheets-Sheet 2

INVENTOR.
Vincent D. Hery.
BY
Wood, Herron & Evans.
ATTORNEYS.

INVENTOR.
Vincent D. Hery.
BY Wood, Herron & Evans.
ATTORNEYS.

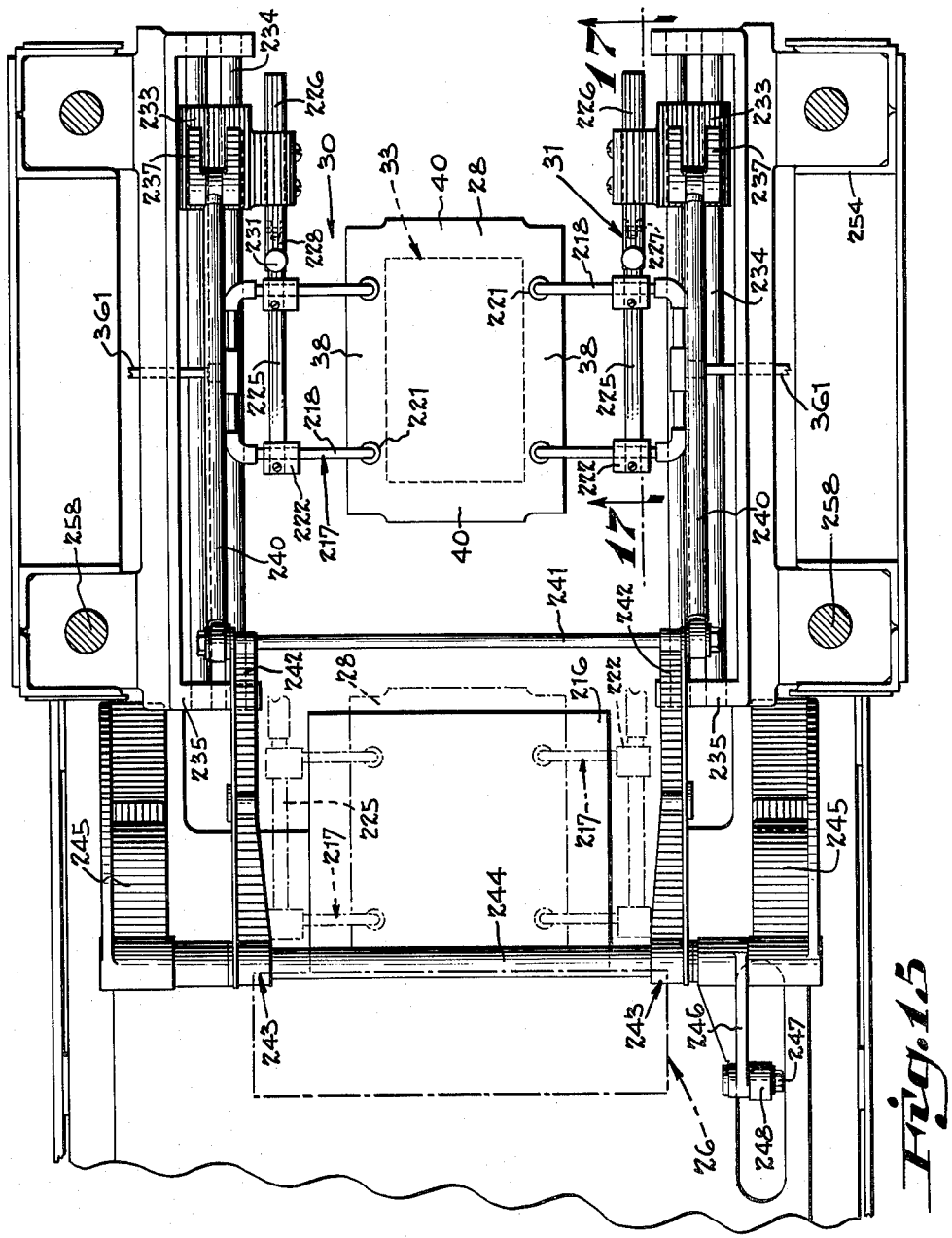

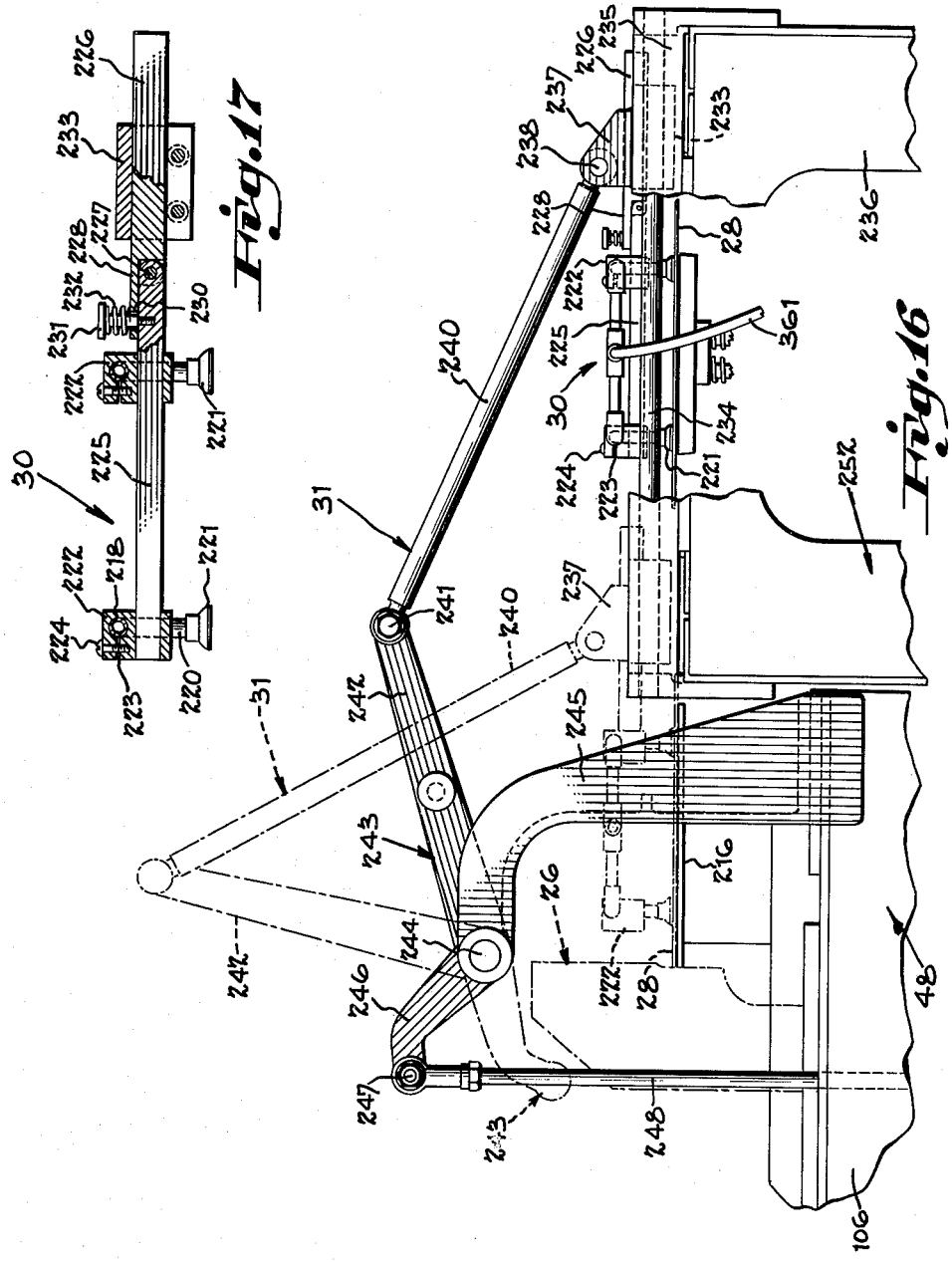

April 4, 1961 V. D. HERY 2,977,860
MACHINE FOR PRODUCING CONTAINERS
Filed June 4, 1957 16 Sheets-Sheet 10
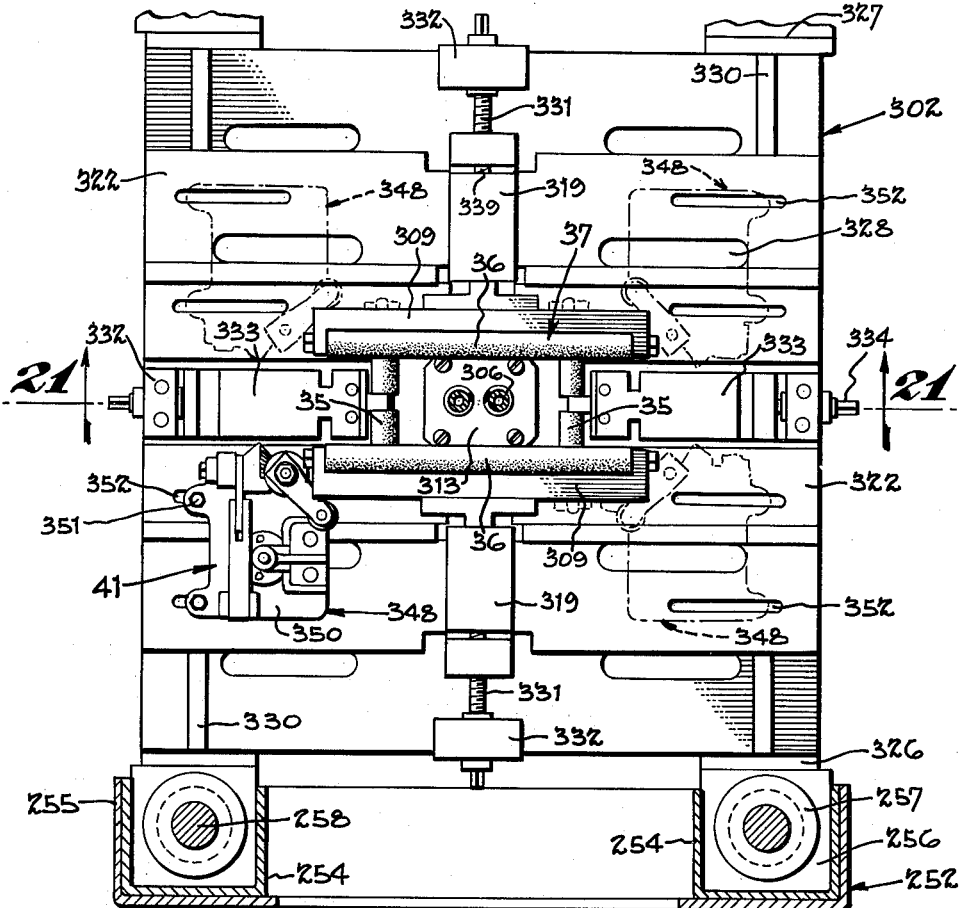
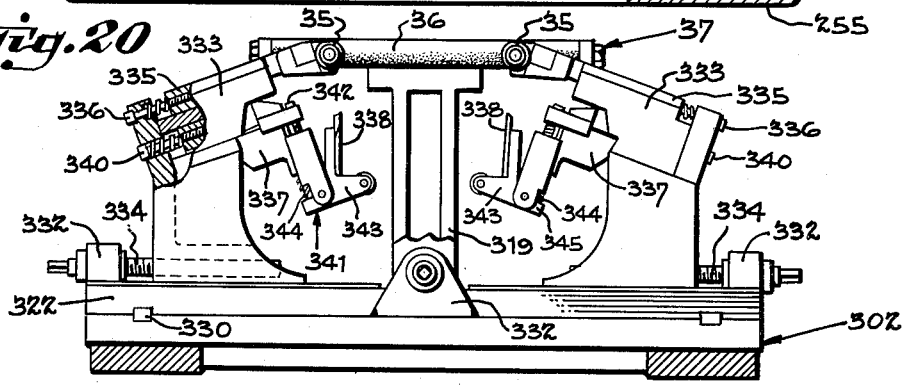
Fig.20
Fig.21
INVENTOR.
Vincent D. Hery.
BY Wood, Herron & Evans,
ATTORNEYS.

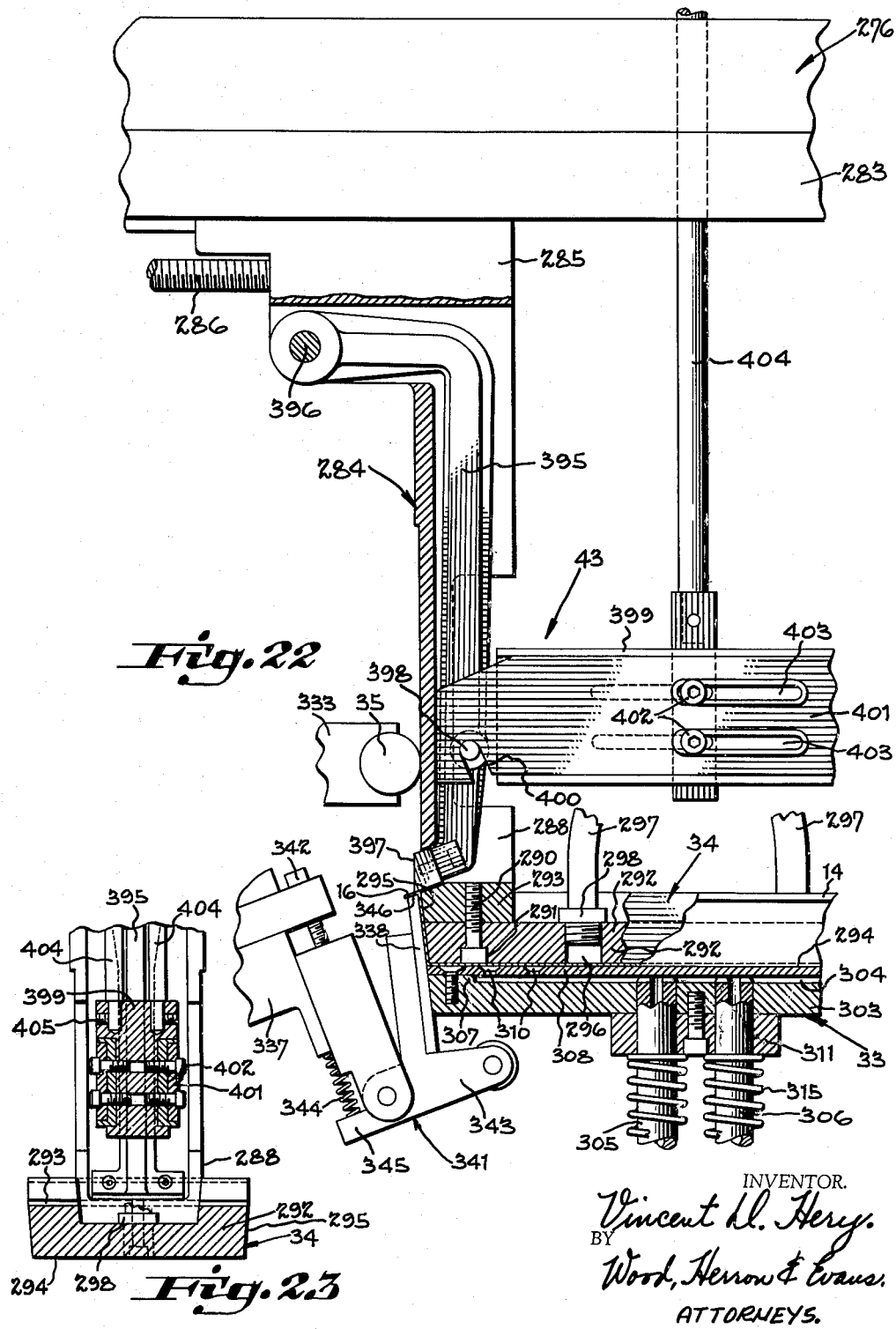

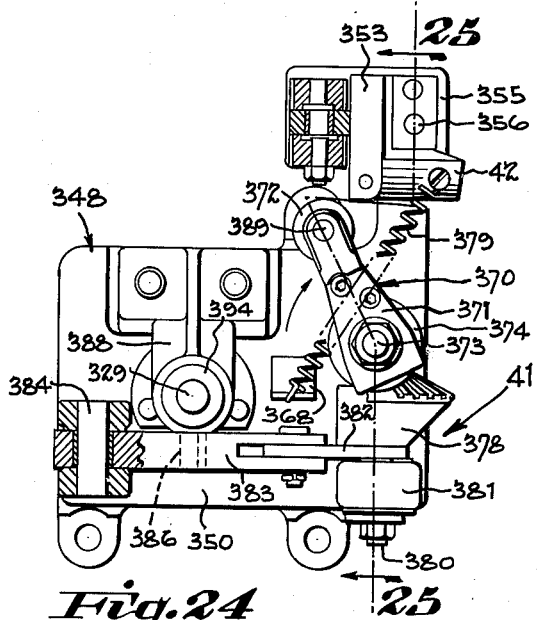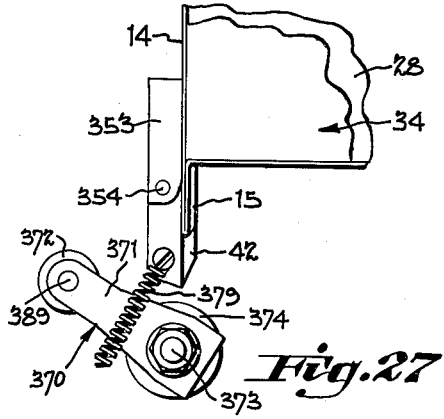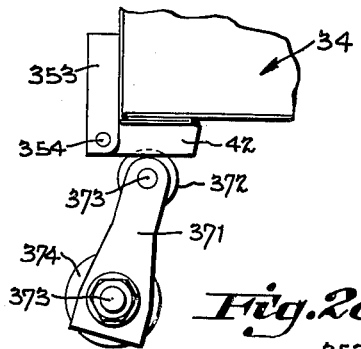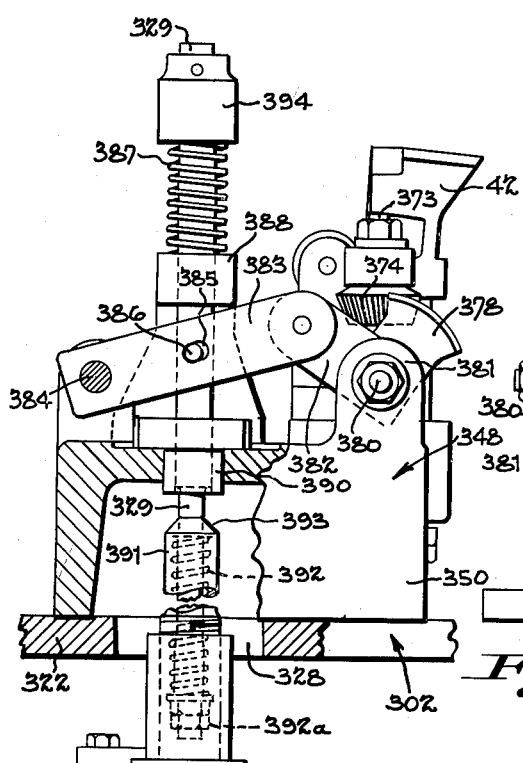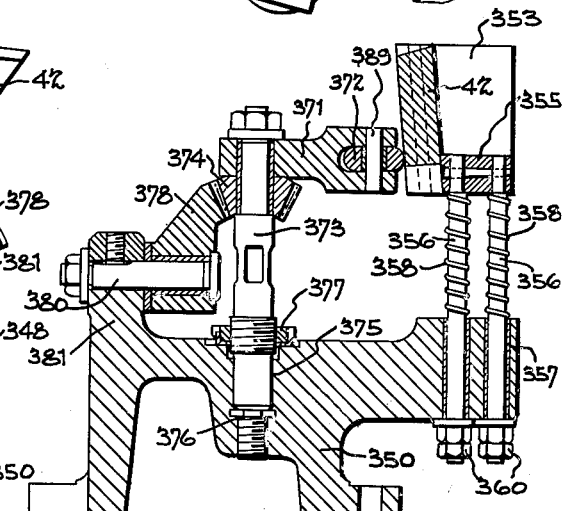

April 4, 1961 V. D. HERY 2,977,860
MACHINE FOR PRODUCING CONTAINERS
Filed June 4, 1957 16 Sheets-Sheet 13

INVENTOR.
Vincent D. Hery.
BY
Wood, Herron & Evans.
ATTORNEYS.

April 4, 1961 V. D. HERY 2,977,860
MACHINE FOR PRODUCING CONTAINERS
Filed June 4, 1957 16 Sheets-Sheet 14

INVENTOR.
Vincent D. Hery.
BY
Wood, Herron & Evans.
ATTORNEYS.

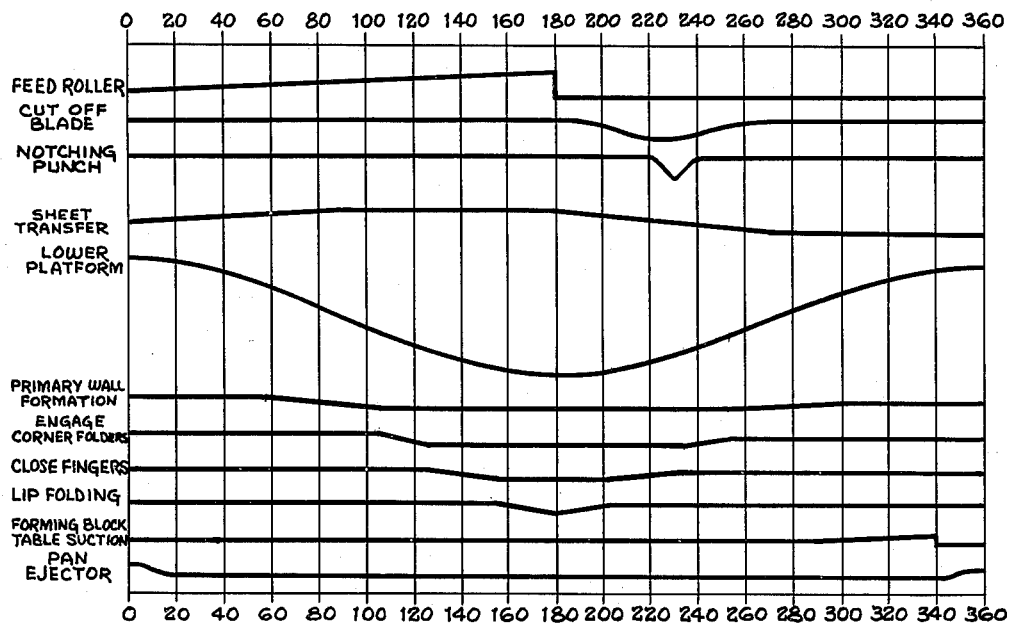
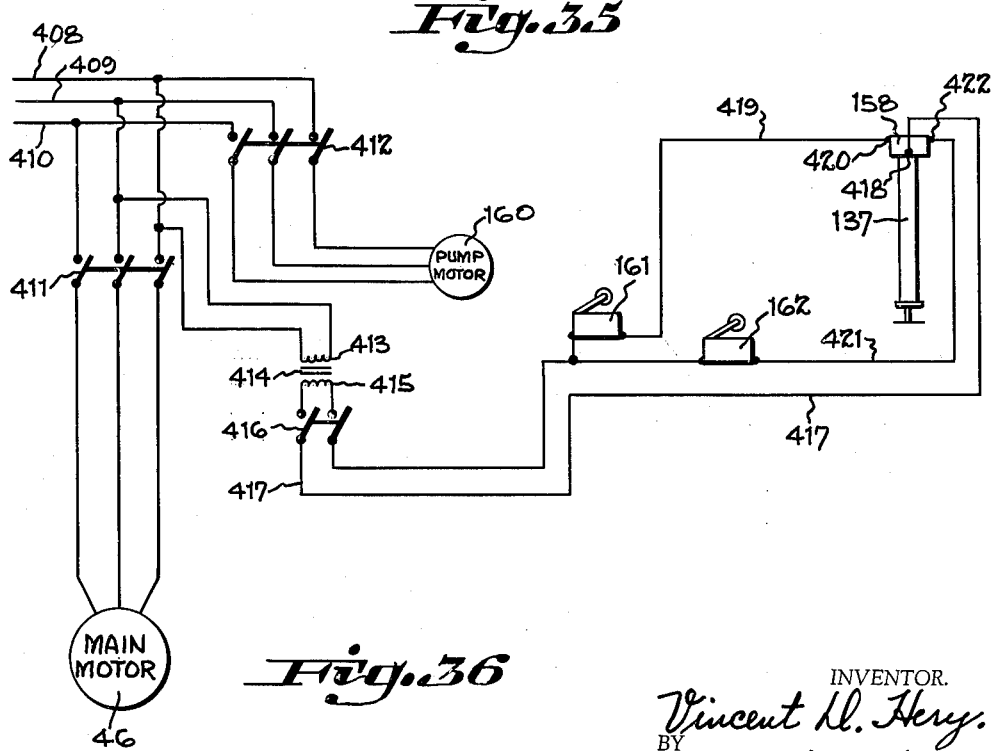

Patent 2,977,860

2,977,860
MACHINE FOR PRODUCING CONTAINERS

Vincent D. Hery, Norwood, Ohio, assignor to The American Tool Works Company, Cincinnati, Ohio, a corporation of Ohio Filed June 4, 1957, Ser. No. 663,396

27 Claims. (Cl. 93—47)

This invention relates to machines for manufacturing containers and is particularly directed to a machine for manufacturing folded rectangular shaped containers including a bottom and upstanding side and end walls.

One typical article adapted to be produced by the present machine is an aluminum foil baking pan. These pans are made from a light weight aluminum foil and in recent years have been used extensively for packaging baked goods and other food products. When foil pans of this type are employed in a bakery, the unbaked raw dough is placed in the pan, and processed in the usual manner. After baking, the finished product is kept in the pan and sold to the consumer using the pan as a package. These pans are advantageous not only because they form attractive containers, but also because they eliminate the cost of emptying and cleaning conventional sheet metal pans.

In the past, folded aluminum foil pans have two disadvantages which have somewhat limited their field of use. In the first place, the cost of producing folded pans has been relatively high, so that these pans were too expensive for use in connection with some very low profit items. Furthermore, in the past it has not been possible to produce large baking pans folded from light weight foil, which pans had sufficient rigidity to withstand the necessary handling.

One of the factors which has heretofore prevented the reduction in cost of aluminum foil pans is the maximum rate at which such pans can be produced on previously available machines as those shown in Vincent D. Hery et al. Patent No. 2,618,207. In machines of that type, pans are produced by feeding a sheet of cut blank material to a plurality of operating stations where the blank is trimmed, crimped and subjected to successive wall folding operations. Such machines require that the blank be accurately indexed at each of several stations. It is these indexing operations that have largely limited the rate at which pans could be produced.

It will readily be appreciated that indexing a foil sheet presents problems quite different from those present in the manufacture of containers, such as cardboard boxes or sheet metal pans formed of relatively rigid material. When working with cardboard, sheet metal or the like, the blank can readily be pushed or pulled to shift it from one station or other. Moreover, the blank is sufficiently thick so that abutments and other conventional mechanical registering means can be employed to position the blank for each successive operation.

On the other hand a sheet of aluminum foil, only a few thousandths of an inch thick, is flimsy and extremely difficult to handle. An aluminum foil blank will not remain flat when it is lifted and cannot be pushed from behind or abutted by a positioning member without severely wrinkling or folding the sheet. The indexing problem is greatly magnified in the production of foil pans since if the pan blank is not properly indexed or is nicked or scratched during a folding operation, a line or weakening is formed, along which the finished pan will tear if subjected to any appreciable strain.

It is a primary object of the present invention to provide a machine for forming folded containers at a high rate of speed so that the cost of the containers is materially reduced. Specifically, the present invention contemplates a machine in which the severed blank is transferred and indexed only once from a cut-off mechanism to a table, or support plate and forming block, the blank being clamped between the plate and table and carried past a plurality of mechanisms which sequentially fold the blank to form upstanding side walls interconnected by corner flaps, fold the corner flaps against the end walls of the box, and lock the flaps in place by folding lips on the upper edges of the end walls downwardly over the flaps.

A second important object of the present invention is to provide a machine for forming pans having greatly increased rigidity so that larger and deeper pans can be formed from light weight foil. More particularly, the present machine is adapted to produce aluminum foil pans having beaded upper edges effective to make the container sufficiently rigid to withstand handling incident to filling, baking, shipping and the like.

In a preferred form of machine constructed in accordance with the present invention, a sheet of aluminum foil or the like is fed to the machine from a continuous roll. This sheet then passes through a beading mechanism which functions to form continuous beads along the two side edges of the sheet. The beading mechanism also functions to accurately align the foil transversely of the machine. After the sheet has passed through the beading device, the sheet is fed to a notching mechanism effective to form spaced notches on each side of the sheet. From the notching device, the sheet engages a feed roll which is effective to draw the sheet through the beading mechanism, past the notching mechanism and to feed the sheet to a shearing mechanism effective to sever predetermined lengths of the sheet to form notched blanks.

After it has been severed, each notched blank is picked up by a transfer device which shifts the blank to the folding mechanism and automatically deposits the blank on a support plate, or table, in proper registration for engagement with a forming block. When the blank is thus positioned, the forming block is shifted downwardly to clamp the blank against the support plate. Continued movement of the forming block and support plate bring the blank into engagement with a primary wall forming means which fold the peripheral portions of the block relative to a base portion to form upstanding side walls, end walls and outwardly extending corner flaps interconnecting the side and end walls. Further movement of the forming block and support plate brings the partially folded blank into registry with a corner folding mechanism effective to fold the corners flat against the end walls of the pan. Thereafter, the upper edges or lip portions of the end walls are bent outwardly; and finally on the return movement of the forming block and support plate, the pan engages means for folding these lips downwardly over the end flaps to secure the flaps in place. Finally, the finished pan is discharged from the folded mechanism by blowing the pan onto an adjacent table or stacking rack.

One of the principal advantages of the present machine is that the notched and severed blank is transferred and registered only once. After this single registering operation, the blank is tightly clamped against the forming block while each of the folding operations is performed. Consequently, the present machine is adapted to produce pans at an extremely high rate of speed; for example one typical machine produces pans at the rate of fifty or more per minute.

A further advantage of the present invention is that the machine is effective to fold the walls, corner flaps and the lips after the side edges of the pan have been beaded, without damaging the configuration of the beads.

A still further advantage of the present machine is that the machine is adapted to produce a wide variety of pans varying in length, width and depth as well as to produce pans having flat, rather than beaded, edges if desired.

An additional advantage of the present invention is that the machine can readily be set-up, or its set-up modified to shift from the production of one size pan to another size pan. Furthermore, to change from one size pan to another requires the replacement of only a few relatively inexpensive parts; so that a producer is not required to make a large investment in dies corresponding to each pan size.

Another advantage of the present machine is that it is relatively compact. In contrast with machines of the type exemplified by Hery Patent No. 2,618,207 in which each of the folding operations is performed along a horizontal bed, in the present machine all of the folding operations are performed during limited vertical shifting movement of a forming block so that the present machine is approximately only one-half as long as previously available equipment.

A still further advantage of the present machine, as explained in greater detail below, is that all motive power for actuating the various component folding mechanisms is derived from the same vertical power stroke which shifts the forming block and support plate. Consequently, the operation of the component folding mechanisms is readily synchronized with the movement of the support plate and forming block, even during high speed operation of the machine.

One of the more detailed objects of the present invention is to provide a beading mechanism for forming uniform arcuate beads on the edges of a foil sheet without causing the sheet to buckle, which mechanism imposes only a minimum tension on the sheet so as not to adversely affect the operation of a feeding mechanism.

A second detailed object of the present invention is to provide a high speed transfer mechanism effective to shift a blank from the cutoff mechanism to a support plate and to accurately deposit the blank relative to the support plate.

These and other objects and advantages of the present invention will be more readily apparent from a consideration of the following detailed description of the drawings illustrating a preferred embodiment of the invention.

In the drawings:

Figure 1 is a front elevational view of a pan forming machine constructed in accordance with the present invention;

Figure 2 is a plan view of a strip of aluminum foil showing the manner in which the foil is beaded and notched, the blank being shown as a projection of the blank in the machine of Figure 1;

Figure 3 is a plan view of a blank severed from the strip of Figure 2;

Figure 4 is a plan view of a completed pan;

Figure 15 is a top plan view of the blank transfer mechanism;

Figure 16 is an elevational view of the blank transfer mechanism;

Figure 17 is a cross sectional view taken along line 17—17 of Figure 15;

Figure 20 is a cross sectional view taken along line 20—20 of Figure 18;

Figure 21 is a cross sectional view taken along line 21—21 of Figure 20;

Figure 22 is an enlarged view, partly in cross section, of the forming block and end lip folding mechanism shown in Figure 19;

Figure 23 is a cross section view taken along line 23—23 of Figure 19;

Figure 24 is a top plan view, partly in section of one corner folding mechanism;

Figure 25 is a cross sectional view taken along line 25—25 of Figure 24;

Figure 26 is an end view of a corner folding mechanism partly in section;

Figure 27 is a diagrammatic top plan view of the corner folding mechanism and pan blank prior to the folding operation;

Figure 28 is a view similar to Figure 27 showing the mechanism in its advanced, or folding, position;

Figure 35 is a timing diagram showing the interrelationship of the various movements and their synchronization;

Figure 36 is a schematic circuit diagram of the electrical connections of the machine;

General description

Figure 34:
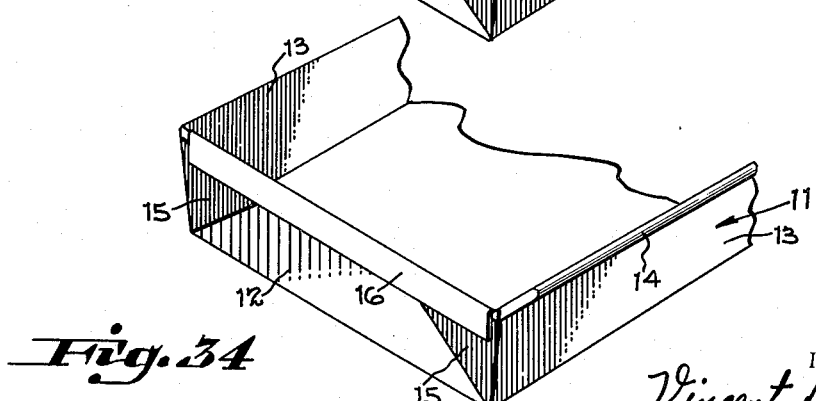
Figure 34 is a view similar to Figure 31 of the finished pan.

One preferred form of machine 10 constructed in accordance with the present invention is particularly adapted to form folded pans of generally rectangular cross-section. The pans 11 shown in Figures 4 and 34 are typical of the pans produced. Each of these pans is formed from light weight aluminum foil approximately .0035 of an inch in thickness and includes upstanding end walls 12, side walls 13 having beaded rims 14, and end flaps 15 interconnecting the side and end walls and being folded flat against the end walls beneath lips 16 formed on the upper edges of the end walls. It is to be understood that the pan shown is only exemplary and that the present invention is adapted to produce pans of different shapes and sizes and is adapted to produce pans having flat, rather than beaded rims if desired. Furthermore, it is contemplated that the present machine can be employed to fabricate pans from aluminum foil of different thicknesses than that specified, as well as from other suitable materials.

The pans are fabricated from a sheet 17 of foil material. This sheet is fed from a large roll (not shown), the roll preferably being equipped with a suitable power unwinding mechanism including an element responsive to the tension in sheet 17. The unwinder, which constitutes no part of the invention, functions to rotate the foil roll so that only a minimum force is required to pull sheet 17 from the roll.

As best shown in Figure 1, when the sheet of foil 17 enters machine 10 it first engages the rollers of beading mechanism 18. This mechanism forms a generally circular bead 14 on each edge of the sheet and additionally functions to accurately align the strip transversely of the machine. From the beading mechanism, the sheet is drawn past a notching mechanism 20 including a pair of spaced notching dies 21 having cooperating punches which are reciprocated by means of a pneumatic cylinder and piston indicated generally at 22, in synchronism with movements of sheet 17 to form spaced notches 23 on opposite sides of the sheet.

The sheet is drawn through the bead forming mechanism and notching mechanism by a feed mechanism 24 including driving rollers 25 and 29 in engagement with the upper and lower surfaces of the sheet respectively. The feeding mechanism is of the intermittent type and functions to feed predetermined lengths of sheet to a cutoff mechanism 26. Cutoff mechanism 26 includes a movable cutting blade 27 actuated in timed synchronism with the feeding mechanism to sever the correct length of sheet to form a blank 28. As best shown in Figure 3, blank 28 is severed along a transverse line extending through the center of notches 23; so that each blank is of rectangular configuration except for a notched portion in each corner.

After the blank has been severed, it is picked up by vacuum fingers 30 of the transfer mechanism 31. This mechanism is effective to shift the blank from the cutoff mechanism to the pan folding mechanism indicated generally at 32. Fingers 30 are shifted in synchronism with the operation of the cutting mechanism and pan folding mechanism and function to deposit blanks 28 upon a support plate or table 33, the blanks being accurately positioned over the table by the fingers which hold the blank until the forming block engages the blank and clamps it against the support plate.

Figure 31:
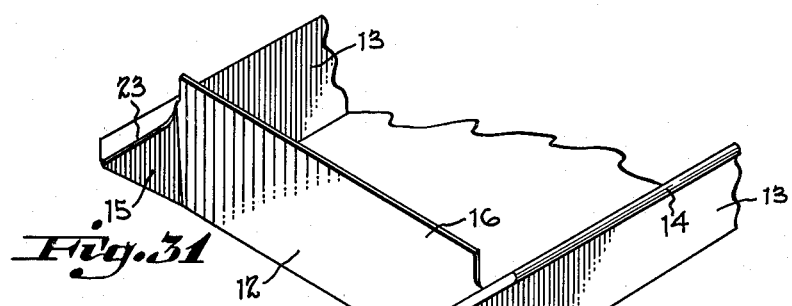
Figure 31 is a partial perspective view of one end of the pan following the primary wall folding operation.

Pan folding mechanism 32 comprises, in addition to support plate 33, a pan forming block 34. This pan forming block is disposed above the support plate and is adapted to be forced downwardly into engagement with the plate so that the blank is clamped between the block and plate. This movement occurs at the beginning of the pan folding cycle. The pan folding mechanism further includes two end rollers 35 and two side rollers 36. These rollers are respectively disposed adjacent to the sides and ends of support plate 33 and constitute part of the primary wall forming mechanism indicated generally by the numeral 37. Specifically, after the forming block 34 has been brought into engagement with a blank disposed upon support plate 33, the forming block is forced downwardly an additional amount so that the support plate blank and forming block move in unison downwardly past end rollers 35 and side rollers 36. These rollers respectively engage the end marginal portions 40 and side marginal portions 38 of blank 28 which extend outwardly beyond the support plate; and function to fold these portions upwardly against the forming block to form upstanding end and side walls 12 and 13 and corner or end flaps 15. The configuration of the blank at the completion of its engagement with the end and side rollers is best shown in Figure 31. As explained in detail below, the side rollers are pivoted outwardly, away from the forming block when the beads 14 are aligned with the rollers so that the rollers do not compress the beads.

Figure 32:
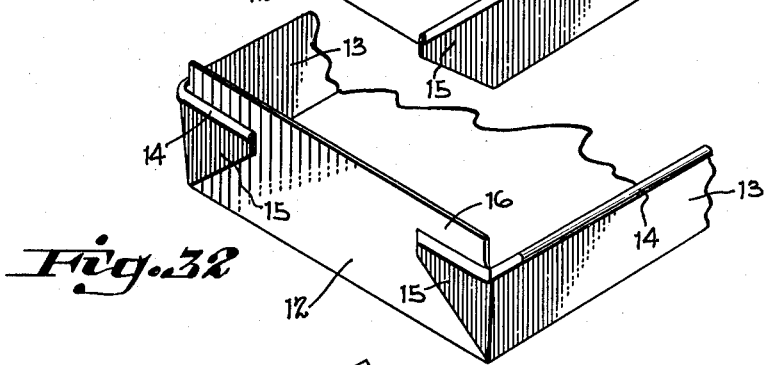
Figure 32 is a view similar to Figure 31 showing the manner in which the corners are folded inwardly against the end wall of the pan.

As the pan forming cycle continues, the forming block, blank, and support plate continue to move in unison for a distance below the primary wall forming mechanism and are brought momentarily to rest in alignment with a corner folding mechanism indicated generally at 41 (Figures 24 to 26). The corner folding mechanism includes four pivoted fingers 42 disposed for engagement with corner flaps 14 and adapted upon pivotal movement to fold the corner flaps inwardly against end walls 12 of the pan, as best shown in Figures 28 and 32.

Figure 33:
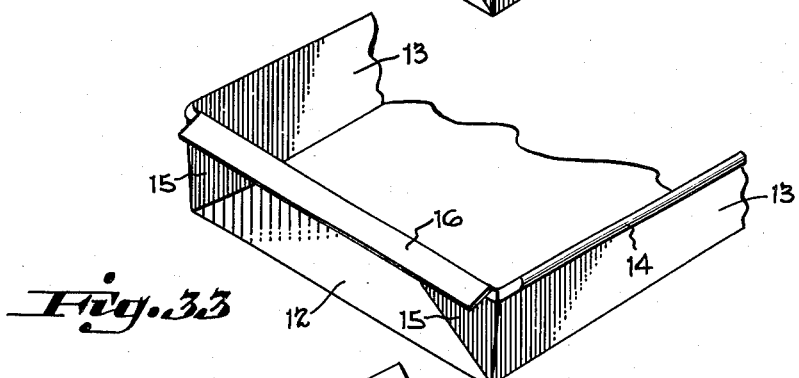
Figure 33 is a view similar to Figure 31 showing the pan with the lip on the end wall folded outwardly over the corner flaps.

The pan folding mechanism 32 further includes a lip folding mechanism 43 which is actuated after the corner flaps have been folded and while the partially formed pan, forming blank and table are stationary. The lip folding mechanism functions to bend upstanding lips 16 constituted by the upper portion of end walls 12, extending above bead 14, outwardly and preferably slightly downwardly to the position shown in Figure 33.

After the lip folding mechanism has been retracted, the table, partially formed pan and forming block are shifted upwardly in unison past the side and end rollers 36 and 35. As the pan moves upwardly past end rollers 35, these rollers force lips 16 downwardly over corner flaps 14 and against side walls 12 of the pan to complete the pan formation. When the support table 33 returns to its original position, its movement is stopped, while forming block 34 continues to move upwardly away from the table to provide a clearance space. The completed pan is forced from contact with the forming block by means of an air pressure system effective to apply air to the interior of the pan, and a suction system for holding it on the support plate. The pan is ejected from the table by means of a suitable pneumatic ejector device 44 (Figure 1) which directs a blast of air against the side of the completed pan, blowing the pan into a discharge chute 45.

Motive power for operating the feeding mechanism, cutoff mechanism, transfer mechanism and folding mechanism, is provided by a motor and speed changer unit 46. This motor unit is mounted upon cross members 47 of frame 48. The output shaft 50 of the speed changer is connected to main drive shaft 51 by means of chain 52 in engagement with sprockets 53 and 54 respectively mounted on output shaft 50 and main shaft 51.

A clutch 55 is inserted in main drive shaft 51 adjacent to drive sprocket 54. The details of construction of clutch 55 constitute no part of the invention. However, in general it can be stated that the clutch includes a movable element 56 connected to a yoke 57, the yoke in turn being connected through link 58 to cross-shaft 60. Each end of cross-shaft 60 is journalled in a suitable bushing 61 carried by frame 48 and carries an operating lever 62. By shifting either of these levers, clutch 55 can be actuated to selectively connect or disconnect the two sections of shaft 51.

The drive for feeding mechanism 24 and cutoff mechanism 26 is taken from shaft 51 by means of a chain 63 in engagement with sprocket 64 carried by the shaft adjacent to bushing 65 which journals the shaft and is carried by a cross-member 66 (Figure 1).

Chain 63 drives a sprocket 67 mounted on splined shaft 68; the shaft being rotatably journalled in block 70. Shaft 68 extends longitudinally of the machine and engages a right angled drive gear unit 71 which in turn drives a transverse shaft 72 which as explained below is directly connected to the feeding and cutoff mechanisms.

A drive for transfer mechanism 31 is taken from main shaft 51 by means of a chain 73 in engagement with a sprocket 74 carried by shaft 51 adjacent to end bearing 75. Chain 73 is connected to input shaft 76 of gear reduction unit 77. Output shaft 78 of this unit drives chain 80 through sprocket 81. Chain 80 in turn engages sprocket 82 connected to input shaft 83 of Geneva drive 84 of the transfer mechanism.

Power for operating pan folding mechanism 32 is taken from shaft 51 through a drive yoke 85. Drive yoke 85 comprises a left-hand member 86 mounted on shaft 51 adjacent to bearing 87 and a right-hand member 88 mounted on extension 90 of the shaft journalled in bearing 91. Yoke members 85 and 86 are secured to a connecting rod 92 which is joined to lower platform 93 of folding mechanism 32. A counterweight 94 is connected to this table through a chain 95, the counterweight being mounted for vertical movement within channel members 96 of the counterweight housing 97.

Means are additionally provided for hand operating the machine when desired, such as when making an initial setup. The manual driving means include a gear reduction unit 98 mounted upon frame cross member 47. The input shaft 100 of the gear reduction unit is connected to a hand crank 101, while the output shaft of the unit is in driving connection with chain 102. This chain passes over a sprocket 103 mounted upon main drive shaft 51.

*Bead forming mechanism*

Bead forming mechanism 18, as best shown in Figures 5–7 and 37, is adapted to curl or bead the longitudinal edges of a foil strip 17. Beading mechanism 18 is mounted upon a secondary slide 104 which is in turn mounted for longitudinal movement relative to a main slide 105. Main slide 105 is mounted on the upper portion of section 106 of frame 48; and is carried by main longitudinal rails 107, the slide being positioned along the rails by means of a longitudinal positioning screw 108. This screw is rotatably journalled in suitable brackets mounted on frame section 106 and threadably engages a suitable sleeve or block carried by main slide 105. The exact details of screw 108 are not shown since they are considered to be readily understood by those skilled in the art. Main frame 105 also carries feeding mechanism 24 and cutoff mechanism 26. As explained below in setting up the machine, main frame 105 is shifted longitudinally in order that transfer mechanism 31, which picks up blanks at the cutoff mechanism is effective to accurately center the blanks upon support plate 33 of the folding mechanism.

Secondary slide 104 is mounted upon ways 110 formed on the upper portion of main slide 105. Secondary slide 104 is shiftable along these ways by means of an adjusting screw 111. This adjusting screw is rotatably journalled in bearing block 112 mounted between ways 110 of primary slide 105; and threadably engages block 113 carried by secondary slide 104. In addition to beading mechanism 18, secondary slide 104 also supports notching mechanism 20. As explained below, secondary slide 104 is shifted longitudinally relative to the primary slide to position the beading mechanism and notching mechanism relative to the feeding mechanism and cutoff knife.

Beading mechanism 18 comprises two side frames 114 and 115. These frames are mounted for transverse adjustment relative to main slide 105. Specifically, side frames 114 and 115 are mounted for movement along dove-tailed cross rail 116, a suitable jib 117 being secured to the cross rail for facilitating transverse movement of the frames. Lateral positioning screws 118 and 120 in respective engagement with side frames 114 and 115 provide means for effecting transverse positioning of the frames. Each of the positioning screws is rotatably journalled in a suitable bearing member 121 carried by secondary frame 104.

Figure 37:
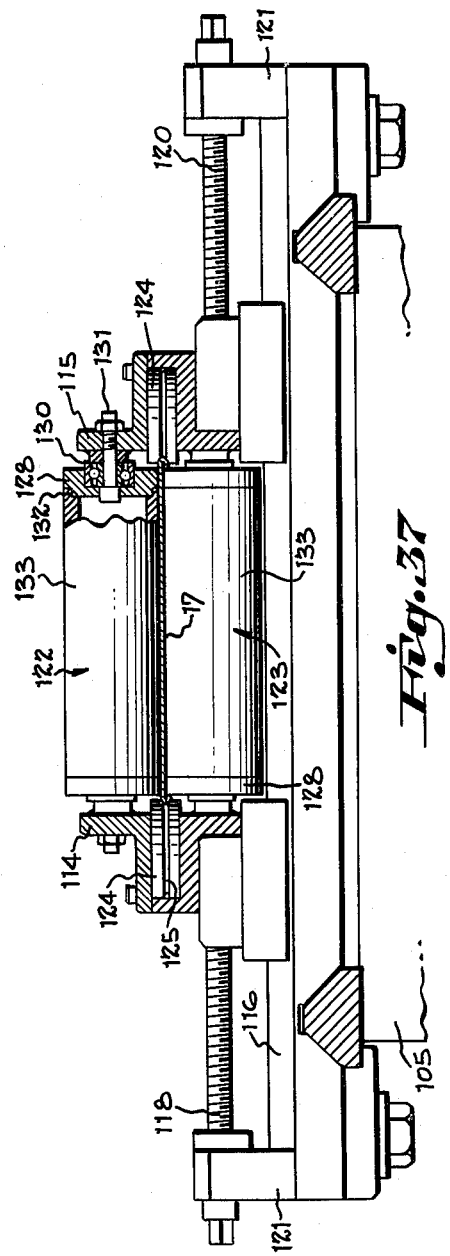
Figure 37 is a cross sectional view taken along line 37—37 of Figure 5.

The side frames rotatably journal plurality of longitudinally spaced upper confining rollers 122 and a like plurality of lower confining rollers 123. These rollers are freely rotatable and the corresponding upper and lower rollers are aligned with one another. The rollers of each pair are spaced from one another at a distance only slightly greater than the thickness of the foil sheet, as best shown in Figure 37. In addition to upper and lower confining rollers 122 and 123, side frame members carry a plurality of beading rollers 124. One beading roller is disposed closely adjacent to the ends of each aligned pair of upper and lower confining rollers 122 and 123. These beading rollers are freely rotatable and turn on an axis at right angles to the axis of rotation of the confining rollers. Each of the beading rollers has a circumferential groove 125 formed therein positioned in alignment with the nip of the adjacent confining rolls. The radius, or cross sectional size, of these grooves progressively decreases with each successive roller 124, the roller at the feeding end 126 of the beading mechanism having the largest groove and the beading roller at the discharge end 127 of the beading mechanism having the smallest diameter groove.

When a sheet 17 of foil material is pulled through the beading mechanism, the beading rolls function to turn beads on each of the feed while the confining rolls prevent the sheet from buckling in a transverse direction. Additionally, the beading rolls accurately position the sheet transversely of the machine so that the sheet is properly disposed for notching and subsequently, the severed blank is correctly positioned for pickup by the transfer mechanism and for disposition by that mechanism in proper transverse alignment with support plate 33 and forming block 34. Because of its construction, beading mechanism 18 imposes only a very small drag upon the sheet; and consequently does not interfere with the operation of the feeding mechanism.

The setup of beading mechanism 18 can readily be modified to handle sheets of varying widths. It will readily be appreciated that thin aluminum foil and similar materials have very little rigidity so that in order to prevent transverse buckling, confining rolls 122 and 123 should extend for substantially the full width of the feed and into close proximity with beading rollers 124. As best shown in Figure 37, each of the confining rollers comprises two end collars, or hubs, 128. These hubs are rotatably mounted by means of roller bearings 130 on pins 131 bolted to side frame units 114 and 115. Each of the collars 130 is provided with an inwardly facing annular shoulder 132 adapted to receive a sleeve 133. In practice, a plurality of sleeves 133 of different lengths are provided with the machine and in order to setup the machine to handle a specific width of sheet, side frames 114 and 115 are shifted outwardly by turning screws 118 and 120 until collars 130 carried by the opposite frames are spaced apart a sufficient distance to receive a sleeve 133 of the proper width. Thereafter, transverse positioning screws 118 and 120 are turned to shift the frame members inwardly until sleeves 133 are tightly clamped between the opposing collars.

*Notching mechanism*

Notching mechanism 20 is effective to form transversely aligned notches 23 in each side of the beaded foil sheet after it emerges from beading mechanism 18. As explained below, the notching mechanism is actuated in synchronism with the operation of feed mechanism 24 and cutoff mechanism 26 so that notches 23 produced by the notching mechanism are spaced longitudinally of the strip, at distances equal to a pan length.

More particularly, notching mechanism 20, as best shown in Figures 1, 5 and 8–10, comprises two upstanding frame members 134 which are bolted or otherwise secured to secondary slide 104, as by means of bolts 135. These frame members carry a generally U shaped upper cross member 136 which is secured to the upright frame members 134 in any suitable manner. Cross member 136, in turn, carries a pneumatic cylinder 137. This cylinder houses a piston having a downwardly extending piston rod bolted or otherwise secured as at 138 to head member 140. Each end of head member 140 is provided with a boss 141 containing a vertical bore in sliding engagement with a guide rod 142. The guide rods are bolted or otherwise secured to upper cross member 140 and to a lower cross member 143.

Head member 140 carries punch holders 144, the punch holders being fastened to the head member in any suitable manner such as by means of bolts 145 which pass through an elongated slot 146 in the head member and threadably engage openings provided in the punch holders. In the embodiments shown in Figure 9, each punch holder 144 carries an elongated punch 147 which is bolted or otherwise secured to the punch holder. Each of the punch holders 144 also carries a stripper pad 148, the stripper pad containing an elongated opening 149 adapted to receive punch 147. The stripper pads are movable in a vertical direction relative to the punches along guide pins 150 and are spring urged downwardly by springs to a position slightly below the lower surface of punches 147.

Notching mechanism 20 also includes two die blocks 21. These die blocks are mounted within a channel 151 formed in lower cross member 143 and are secured in place by means of bolts 152 which pass upwardly through elongated slots 153 formed in the cross member and threadably engage openings formed in the die block. Each of the die blocks 21 has machined therein a die opening 154 adapted to closely receive punch 147. Precise alignment between the punches and dies is obtained by means of aligning rods 155 which are secured in any suitable manner to punch holders 144 and are telescopically received in openings formed in die blocks 21.

Cylinder 137 is a double acting cylinder having inlet and outlet openings on opposite sides of the piston head. When compressed air is introduced above the piston head, the piston is forced downwardly forcing head 140 and punches 147 toward die blocks 21. Conversely, when air is introduced on the underside of the piston, the piston is forced upwardly and is effective to raise head 140 and punches 147 away from die blocks 21. Compressed air is supplied to the piston from a pump 156 mounted upon frame section 106 and connected to the pump through air line 157 and valve 158. Pump 156 is driven by pump motor 160 which is also mounted upon frame section 106.

Figure 12:
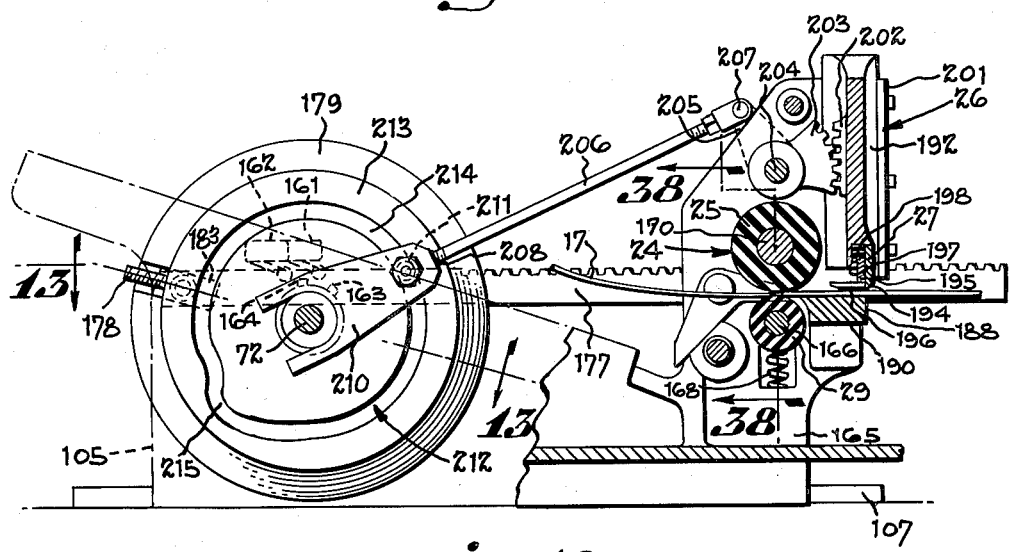
Figure 12 is a cross sectional view taken along line 12—12 of Figure 11, a portion of the frame being broken away to show details of the cutoff knife driving mechanism.

In the embodiment shown, valve 158 is a solenoid actuated valve which is constructed and arranged so that when one solenoid is energized, compressed air is introduced on top of a piston, and the chamber beneath the piston is vented. When the other solenoid is energized, air is introduced into the space below the piston and the space above the piston is vented. The solenoids of valve 158 are placed in electrical connection with microswitches 161 and 162 mounted on a wall of main frame 105 and disposed for respective engagement with cam lugs 163 and 164 carried by transverse shaft 72 (Figure 12). It will be appreciated that if desired, valve 158 could be mechanically actuated in synchronism with the feed mechanism by means of a suitable cam or linkage arrangement.

The electrical circuit details of pump motor 160, switches 161 and 162, and solenoid valve 158 are best shown in Figure 36. As there shown, three-phase power is supplied through lines 408, 409 and 410. These lines are connected to main motor 46 through switch 411 and to pump motor 160 through switch 412. Pump motor 160 drives both vacuum pump 300 and pressure pump 156. Primary winding 413 of a stepdown transformer 414 is connected to lines 409 and 408 while the secondary winding 415 of this transformer is connected to a double pole single throw switch 416. One terminal of this switch is connected through lead 417 to a common terminal 418 of solenoid valve 158. The other terminal of switch 416 is connected through microswitch 161 and lead 419 to terminal 420 of solenoid 158. This same terminal of switch 416 is similarly connected through microswitch 162 and lead 421 to terminal 422 of the solenoid valve 158.

*Feeding mechanism*

Figure 5:
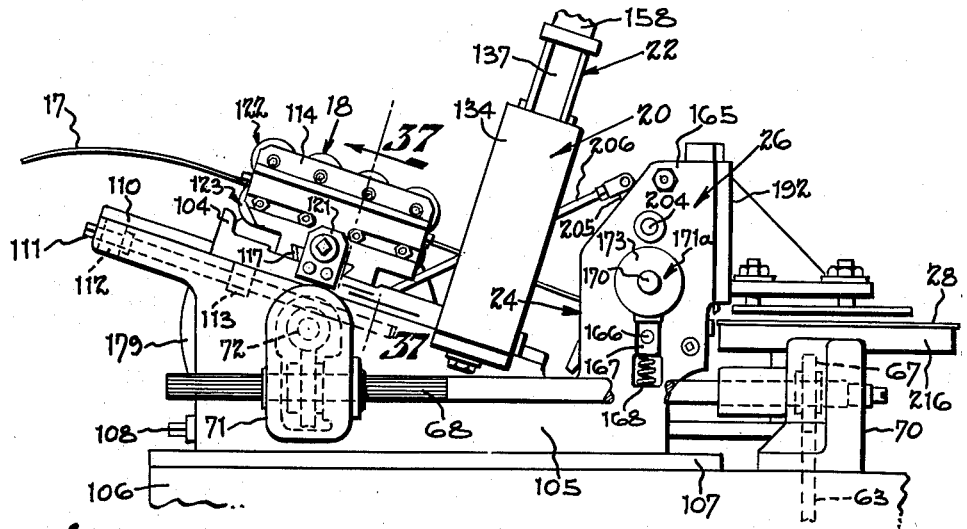
Figure 5 is a front elevational view of the beading, notching and cutoff mechanism.
Figure 6:
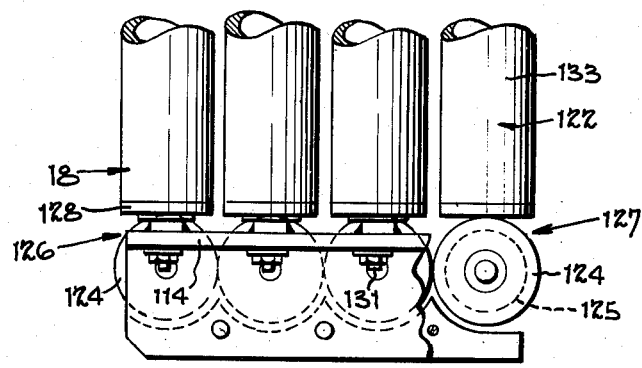
Figure 6 is a partial top plan view of the beading mechanism partially broken away to show details of construction.
Figure 7:
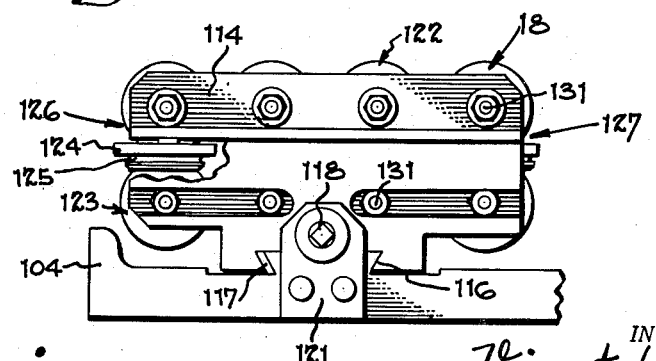
Figure 7 is an enlarged elevational view of the beading rollers, a portion of the roller frame being broken away to show details of construction.
Figure 8:
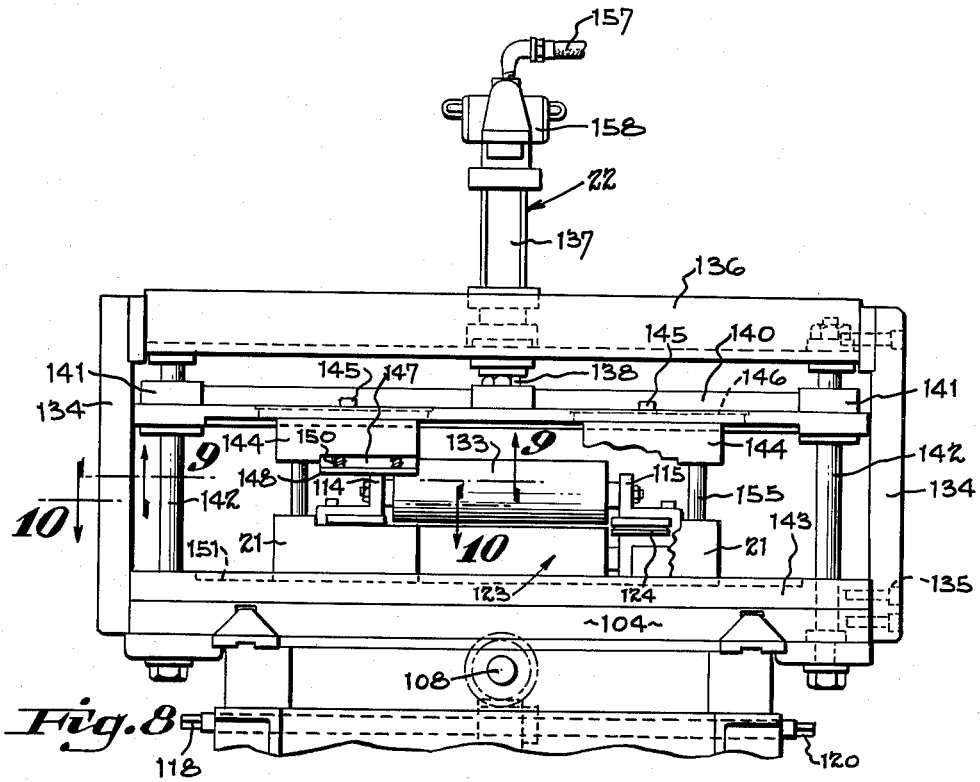
Figure 8 is an end view of the notching mechanism looking toward the beading mechanism, a portion of the notching mechanism being broken away to show the relationship of the notching mechanism and beading rollers.
Figure 9:
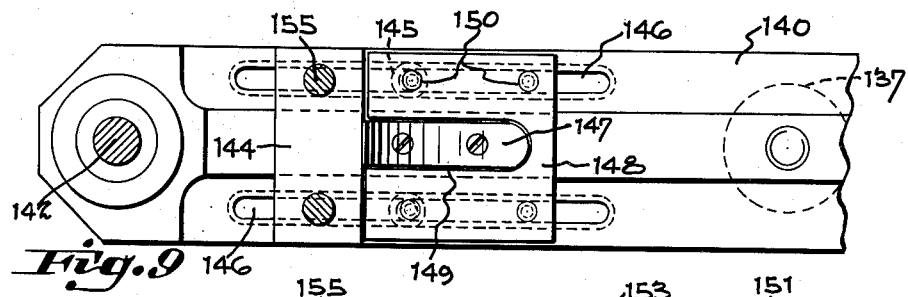
Figure 9 is a cross sectional view taken along line 9—9 of Figure 8.
Figure 10:
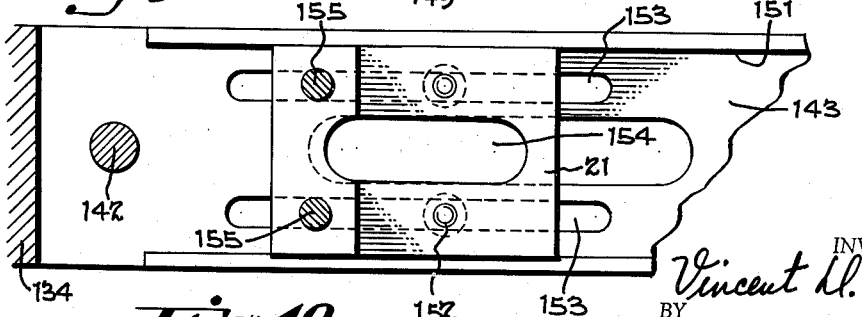
Figure 10 is a cross sectional view taken along line 10—10 of Figure 8.

Feeding mechanism 24 is best shown in Figures 5 and 12. This mechanism functions to pull the strip of foil 17 through the beading mechanism and past the notching mechanism and to intermittently deliver successive predetermined lengths of sheet to the cutoff mechanism. The feeding mechanism is effective to accurately control the length of sheet fed to the cutoff mechanism so that blanks of uniform length are severed by that mechanism.

Feeding mechanism 24 includes a pair of driving rollers 25 and 29, disposed to receive the strip of foil after it has been discharged from notching mechanism 20. More particularly, rollers 25 and 29 are journalled in side plates 165 of main slide 105. Upper roller 25 is a driven roller, while roller 29 is spring urged upwardly toward roll 25 to provide adequate pressure between the foil strip 17 and feed roll 25 to prevent slippage. Roller 29 is mounted upon a shaft 166 journalled in bearing blocks 167 which ride in a vertical slot formed in side plate 165. A spring 168 is compressed between the bottom of the slot and the upper edge of block 167 so that the spring is effective to force the block upwardly. The upper, or driven roller 25 is mounted upon a shaft 170 which extends outwardly beyond side plates 165. Each of the sections of shaft 170 extending beyond these plates is provided with a clutch 171, 171a. The exact construction of these clutches constitutes no part of the present invention, one suitable form of clutch being shown in Vincent D. Hery et al. Patent No. 2,736,509.

Figure 38:
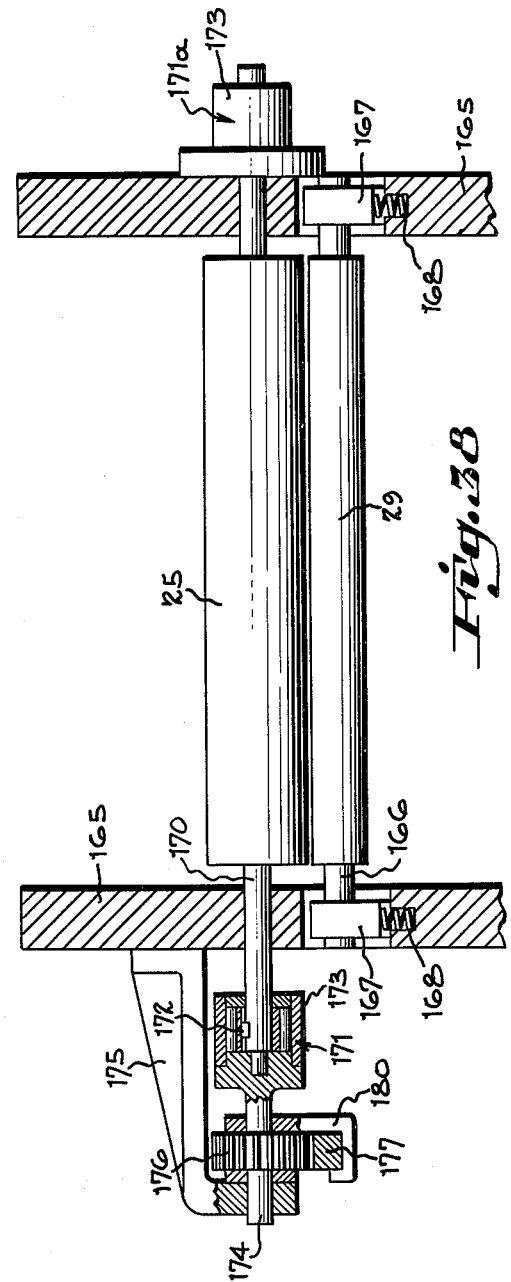
Figure 38 is a cross sectional view taken along line 38—38 of Figure 13.

In general however, as best shown in Figure 38, one extension of shaft 170 is keyed to an internal driven element 172 of overrunning clutch 171. The housing 173 of this clutch is connected to a shaft extension 174 rotatably journalled in a suitable bracket 175 projecting outwardly from side plate 165. Shaft extension 174 is driven by a gear 176 which is keyed or otherwise secured to the shaft. Overrunning clutch 171 and locking clutch 171a function in such a manner that shaft 170 and feed roll 25 are rotated in a feed direction (counterclockwise in Figure 12), whenever gear 176 is turned in a feed direction; and shaft 170 and roller 25 remain stationary when gear 176 is rotated in the opposite direction. Locking clutch 171a on the opposite end of shaft 170 from clutch 171 is substantially identical with the clutch described above. However, housing 173 of that clutch does not rotate and functions to lock the feed roll against rotation during the idling or return rotation of gear 176.

Briefly therefore, when gear 176 is rotated in its forward direction feed roll 25 is advanced in the sheet feeding direction (counterclockwise in Figure 12). When the gear is turned in the reverse direction, feed roll 25 is locked in position by clutch 171a. Both clutches 171 and 171a operate without any lost motion and coact with one another to intermittently feed accurately measured lengths of sheet in response to the degree of rotation imparted by gear 176 to the driving clutch.

Figure 13:
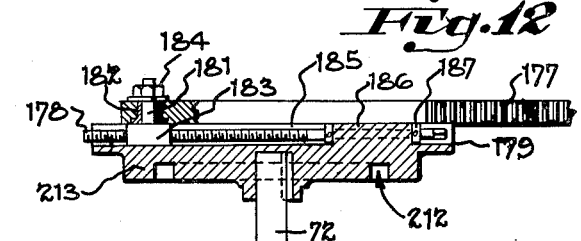
Figure 13 is a cross sectional view along line 13—13 of Figure 12.

Gear 176 is rotated by an elongated rack 177, the rack in turn being driven by means of a driving disc 179 as shown in Figures 12 and 13. The free end of rack 177, that is the portion in engagement with gear 176, is slidably supported in a cradle member 180, as best shown in Figure 38. This cradle element is pivotally supported on shaft extension 174 between gear 176 and the adjacent clutch unit 171. The opposite end of rack 177 is pivotally connected to driving disc 179 by means of a pivot stud 181 which passes through and is journalled in a bearing element 182 carried by the rack. The inner end of this stud is secured in any suitable manner, such as by welding or a screw thread connection to an adjustable block 183 which is in turn threadably mounted upon an adjusting screw 178 carried by the driving disc. The outer end of stud 181 is threaded and carries a nut 184 for holding the rack upon the stud.

Adjustable block 183 is slidably mounted within a channel 185 in disc, this slot extending radially of the disc 179. Adjustment screw 178 is disposed within the channel and is rotatably supported in a journal portion 186 of the disc disposed on the opposite side of center from adjustment block 183. Retaining collars 187 are mounted upon the adjustment screw on opposite sides of journal portion 186 for holding the screw against axial displacement. By rotating adjusting screw 178, driving block 183 may be moved radially relative to driving disc 179 to vary the effective throw of the screw and driving block, and in turn, the amount which rack 177 is shifted during each rotation of the driving disc. Driving disc 179 is keyed or otherwise mounted upon transverse shaft 72; and it will readily be appreciated that as block 183 is shifted outwardly from the axis of this shaft, the throw of the disc is increased from zero toward a maximum amount when the disc is secured adjacent to the outer end of the adjusting screw.

As indicated previously, transverse shaft 72 is driven from splined shaft 68 through gear unit 71. Shaft 68 is in turn driven from chain 63 which interconnects sprocket 67 on shaft 68 and a sprocket on main drive shaft 51. Thus, so long as main clutch 55 is actuated, driving disc 179 is rotated continuously and reciprocates rack 177 producing intermittent motion of the feed roll, locking clutch 171a of the feed roll preventing back rotation when the rack is performing a return, or idling, movement.

Cutoff mechanism

Cutoff mechanism 26 is best shown in Figures 1, 5, 11 and 12. As there shown, cutting mechanism 26 comprises a fixed lower blade 188 mounted in any suitable manner between side plates 165 of main slide 105. The lower blade rests in a channel formed in cross plate 190 and is secured in place by means of screws 191. Lower cutoff blade 188 cooperates with movable upper cutoff blade 27 to cut the foil sheet along a transverse line.

Movable blade 27 is mounted upon the lower edge of a vertically sliding member 192. The cutting blade resides within a cross channel formed on the edge of the slide and is secured in place by means of screws 193. The lowermost edge of the blade is chamfered as at 194 to form a cutting edge. When vertical sliding member 192 is lowered, the back surface and lower edge of the blade come into snug contact with the outer upper edge of stationary blade 188, thereby cleanly shearing the foil material along a transverse line.

Figure 11:
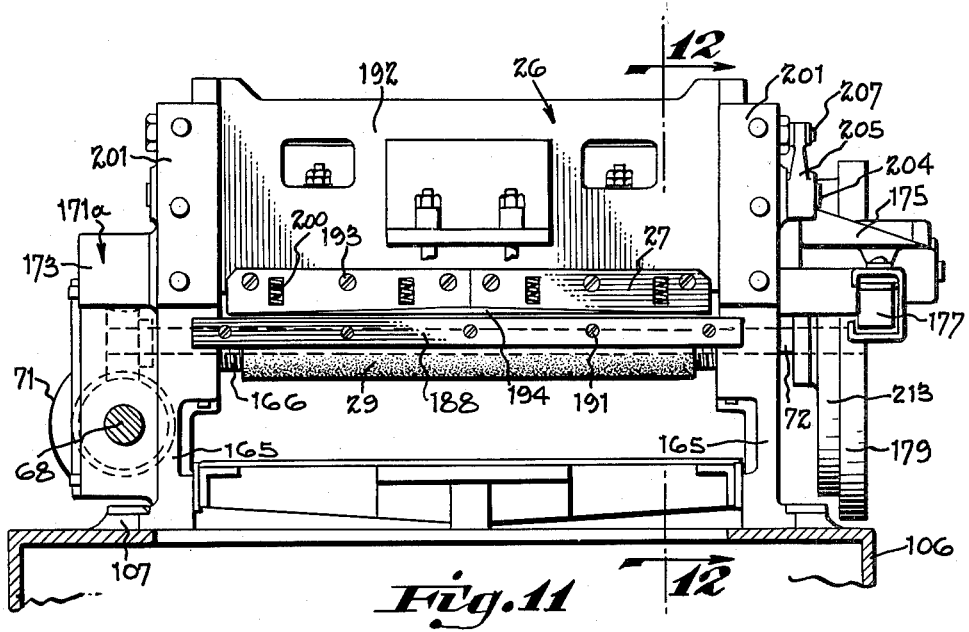
Figure 11 is an end view of a cutoff mechanism.

Means are provided for firmly clamping the foil sheet in place during the cutting operation. As best shown in Figures 11 and 12, these means comprise a spring urged clamping bar 195 which is mounted parallel with and behind upper cutting blade 27. As shown in Figure 12, this clamping bar is mounted within a vertical channel formed at the lower edge of vertical slide 192; the lower edge of the clamping bar is provided with a foot 196 which may be faced with rubber or other high friction material if desired. Foot 196 of the clamping bar normally projects beneath the lower edge of the vertical slide and beyond the edge of the upper cutting blade.

In order to retain the clamping bar in assembled relationship with the vertical slide when the cutting blade is in its upper position, the channel is provided with a lip 197 at its lower end cooperating with a cross flange 198 formed on the upper end of the clamping bar. This cross flange abuts the lip whenever the upper cutting blade is raised; and is urged into this position by means of coil springs 200 disposed between the upper surface of the clamping bar and the top wall of the channel which receives the clamping bar.

In operation, as slide 192 is lowered foot 196 of the clamping bar engages foil sheet 17 and clamps it against the upper surface of stationary blade 188 prior to the time that the upper cutting knife engages the sheet, the upper knife blade moving relative to the clamping bar during the final portion of vertical slide's downward travel. Vertical slide 192 is guided during its reciprocating movement by the forward edges of side plates 165 and end guide plates 201.

The drive means for shifting the vertically sliding plate comprise a rack 202 mounted upon the rear surface of the plate and adapted for cooperative engagement with a gear segment 203 pivotally mounted upon shaft 204 carried by side plate 165. Gear segment 203 is connected or formed integral with arm 205 which is in turn pivotally connected to link 206 by means of pin 207. The opposite end of link 206 is joined as at 208 to a cam follower 210. Cam follower 210 is slidably mounted on transverse shaft 72 and includes a lug 211 disposed within cam track 212 formed in cam member 213. Cam track 212 includes a generally circular portion 214 and an outwardly extending portion 215.

So long as follower lug 211 is in engagement with circular portion 214 of the cam track, vertical slide 192 is held in its raised position as shown in Figure 12. However, when the cam follower engages outwardly extending portion 215 of the cam track, link 206 is forced to the right so that gear segment 203 is pivoted downwardly causing vertical slide 192 to be shifted downwardly, whereby upper blade 27 severs the foil sheet along a transverse line. As explained below, cam track 212 is oriented relative to shaft 72, and hence coordinated with the operation of the feeding mechanism so that the sheet is severed by blade 27 when the proper amount of sheet material has been advanced relative to the blade and the feeding mechanism is idle.

Transfer mechanism

Transfer mechanism 31 is best shown in Figures 1 and 15–18. This mechanism functions to transfer blanks 28 which have been severed by the cutoff mechanism from the cutoff station to support plate or table 33. The transfer mechanism also functions as a registering device effective to accurately align the blank relative to the support plate so that the blank is symmetrically disposed both longitudinally and transversely relative to the support plate.

As shown in Figure 16, when a blank 28 is severed by cutoff mechanism 26 the blank is supported by a platform 216, the platform preferably being of greater width than the width of the blank. Transfer mechanism 31 comprises four vacuum fingers 30 adapted to be shifted over a blank supported on platform 216 and to pick up the blank from the platform by means of a suction force. The fingers are further adapted to release the blank when it is positioned over support plate 33 and the vacuum within the fingers is released.

Figure 29:
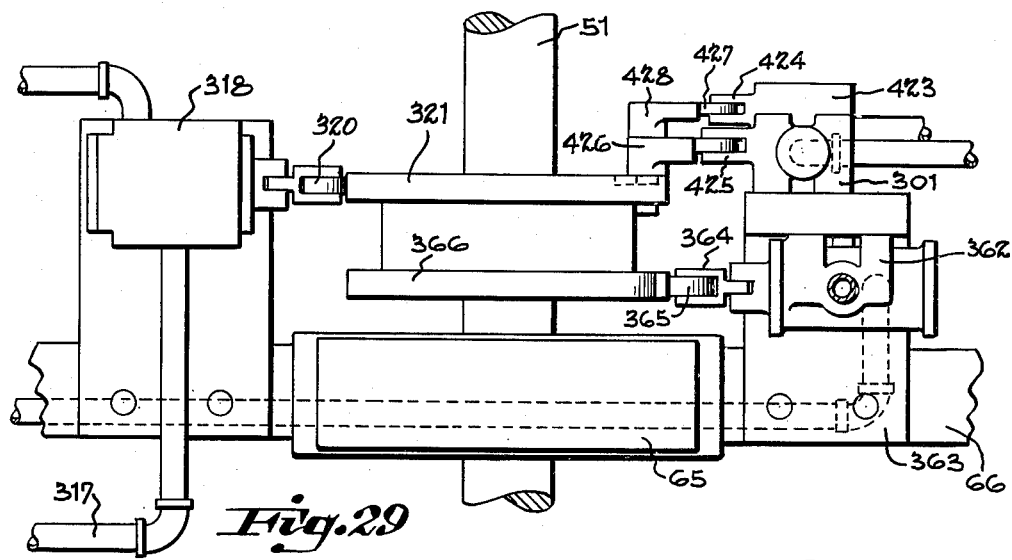
Figure 29 is a top plan view of the cams provided for controlling the vacuum lines to the transfer mechanism, forming blank, and support plate.
Figure 30:
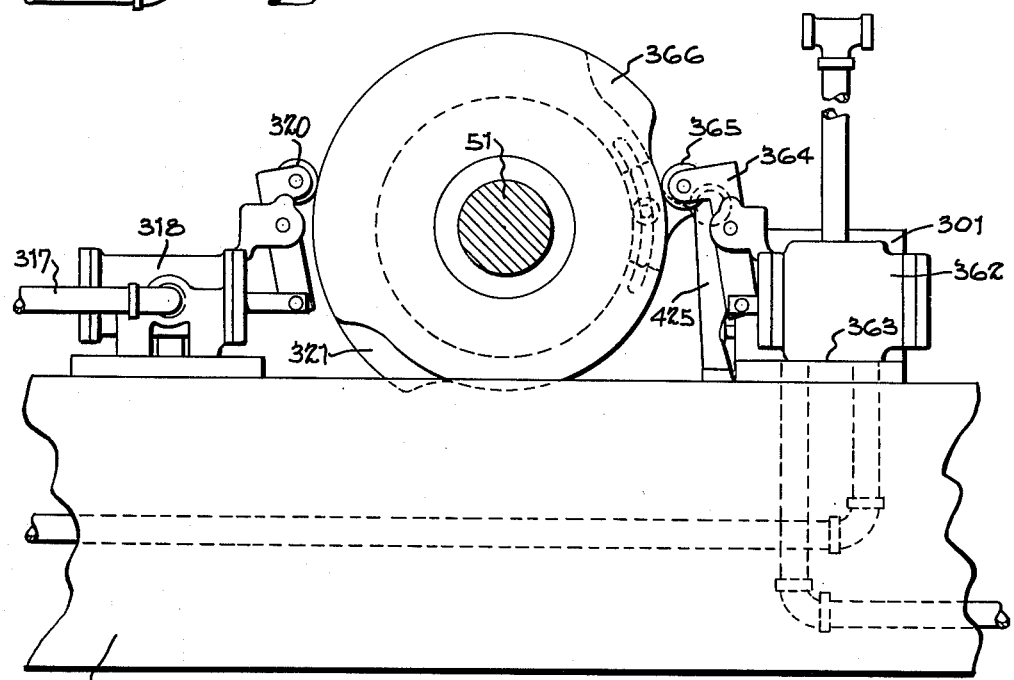
Figure 30 is a side elevational view of the cams shown in Figure 29.

More particularly, two vacuum fingers 30 are disposed on each side of the machine, the fingers of each side being spaced longitudinally from one another. Each of the vacuum fingers comprises a length of rigid tubing 217 bent to form an inwardly extending section 218 and a downwardly extending section 220. The lower end of tubing section 218 carries a vacuum cup 221. Tubes 217 are connected to a vacuum pump 300 through a length of flexible tubing 361 and a valve 362. As shown in Figures 29 and 30, this valve is mounted upon a plate 363 and includes an arm 364 carrying a roller follower 365 which tracks upon cam 366 mounted upon main shaft 51.

Each length of tubing is clamped in a mounting block 222 having a bore for receiving the tube and having a slit 223 and screw 224 for tightly securing the tube in place. Blocks 222 are in turn mounted upon a longitudinally extending pivoted arm 225. Each of the arms 225 is pivoted to a carrier member 226 by means of a pin 227. Carrier member 226 includes a flange 228 extending over arm 225 and provided with an aperture 230 adapted to receive a stud 231. This stud threadably engages arm 225 and carries a spring 232 compressed between the head of the stud and flange 228. The spring and stud are thus effective to urge arm 225 into a horizontal position as shown in Figure 17 while permitting limited downwardly movement of the arm when required.

Carrier member 226 also includes a double sleeve portion 233 adapted to engage longitudinal guide rods 234, two of these rods being disposed on either side of the transfer mechanism and being carried by suitable brackets 235 bolted, welded, or otherwise joined to vertical frame members 236. The upper portion of each carrier member 226 includes spaced upwardly extending flanges 237 which are pivotally connected as by pin 238 to an end of link 240. The opposite end of links 240 are pivotally joined by rod 241 to arm 242 of bell crank lever 243. This lever is in turn mounted upon a cross shaft 144 rotatably journalled in upstanding bracket arms 245 carried by the main machine frame 48.

Figure 14:
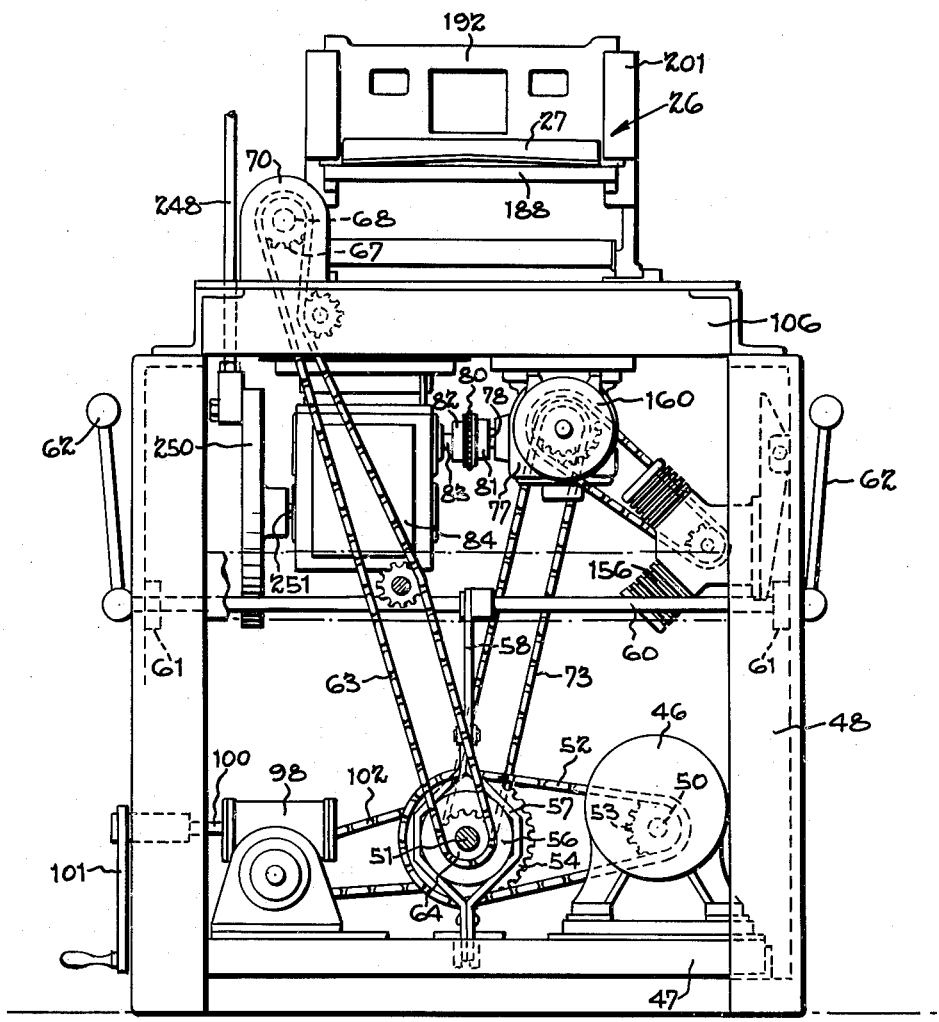
Figure 14 is an end view of the cutoff unit showing details of the drive arrangement.

Bell crank lever 243 includes a second arm 246 which is pivotally joined by pin 247 to rod 248. Rod 248 is pivotally connected to the periphery of a wheel 250 mounted upon output shaft 251 of geneva mechanism 84, (Figure 14). As indicated above, input shaft 83 of the geneva mechanism is connected through chain 80, gear reduction unit 77 and chain 73 to main drive shaft 51, whereby the geneva mechanism is operated in synchronism with the feeding, cutoff, and folding mechanisms which are also driven from main shaft. The exact details of geneva mechanism 84 constitute no part of the present invention and many suitable units are commercially available. It will suffice here to state that geneva mechanism 84 rotates wheel 250 exactly one revolution every operating cycle.

When wheel 250 is positioned so that the connection between that wheel and rod 248 is in its uppermost position, bell crank 243 is pivoted in a clockwise direction to shift carrier member 226 to its extreme right hand position as shown in Figures 1 and 16, whereby, vacuum fingers 217 position a blank 28 over support plate 233 as shown in full lines in Figures 15 and 16. On the other hand, when the geneva drive 84 rotates wheel 250 to bring the connection of that wheel and rod 248 to its lowest point, bell crank lever 243 is pivoted in a counter-clockwise direction to draw carrier member 226 and vacuum fingers 217 to their extreme left hand position in alignment with a blank disposed on platform 216 as shown in dotted lines in Figures 15 and 16.

As indicated below, support plate 33 includes suction means for gripping blank 28. These suction means are effective to permit arms 225 to pivot downwardly when blank 28 is forced downwardly by forming block 34. As explained below, vacuum is maintained in fingers 30 until blank 28 is clamped between the support plate and forming block. Thereafter, the vacuum in the support fingers is relieved and the arms spring upwardly. As a result, blank 28 is positively held at all times and there is no free fall involved in the transfer of the blank which might cause it to become misaligned with support plate 33.

*Pan folding mechanism*

The pan folding mechanism 32 is effective to fold a flat, cut and notched blank 28 which is deposited upon support plate 33, into a completely folded pan as shown in Figures 4 and 34. In general, the pan folding mechanism comprises a primary wall forming mechanism 37 effective to fold the side and end walls of the pan to the shape shown in Figure 31, a corner folding mechanism 41 for folding the corner flaps inwardly against the end walls to the position shown in Figure 32, and a lip folding mechanism effective to turn end lips 16 outwardly to the position shown in Figure 33. The final step in forming the pan i.e., bending the lips downwardly against the end walls, is performed by the end rolls 35 of the primary wall folding mechanism.

More particularly, the folding mechanism is mounted upon section 252 of the machine frame. This frame section comprises four vertical corner posts 236 preferably formed of U shaped channel members 254 welded or otherwise secured to the interior of angle irons 255. Each of the corner members 253 carries a plurality of bearing blocks 256, preferably fitted with Oilite bushings 257 or similar bearing members.

The folding mechanism further comprises four vertical pull rods 258, one of the rods being slidably journalled in the bearings mounted in each of the four corner members 236. Pull rods 258 are in engagement with a lower platform 93 and are adapted to be reciprocated vertically in accordance with movements of the platform. More particularly, lower platform 93 is generally rectangular and includes four sleeves 260 surrounding the lowermost turned-down sections 261 of pull rods 258.

As indicated above, platform 93 is joined to a connecting rod 92 which in turn is driven by yoke member 85 in connection with main shaft 51. Consequently, as main driving shaft 51 is rotated yoke 85 reciprocates connecting rod 92 causing platform 93 to be raised and lowered. As the platform is raised, sleeves 260 engage shoulders 262 formed on the pull rods forcing the pull rods upwardly in unison with movement of the platform. When the platform is lowered, the weight supported by the pull rods causes them to follow the platform downwardly.

Platform 93 is also connected to chains 95 which pass over sprockets 263 pivotally carried by brackets 264. Chains 95 extend outwardly and into engagement with idler sprockets 265 mounted on counterweight housing 97. The opposite ends of these chains are connected to counterweight 94 mounted for vertical reciprocating movement within housing 97 for counter-balancing the weight supported by platform 93.

Pull rods 258 carry at their upper ends an upper head member 266. This upper head member comprises two rod spacer members 267 having sleeves 268 formed on the ends thereof, the sleeves being fitted over upper turned down portions 270 of rods 258 above shoulders 271. Upper head member 266 also includes a cross piece 272, this cross piece is preferably channel-shaped and is welded or otherwise secured to rod spacers 267. Suitable gussets or other strengthening members are provided between the cross piece and rod spacer. Cross piece 272 carries adjacent to the center portion thereof a support block 273. Upper head member 266 is supported upon pull rods 258 by means of four heavy compression springs 274. These springs are compressed between the lower surface of sleeves 268 and the upper surface of sleeves 275 formed on main head member 276. Upper head member 266 is urged against these springs by means of nuts 277 in engagement with threaded ends 278 of the pull rods.

Rods 258 also carry main head member 276, the main head 276 comprising two end members 280. Each of the end members carries two sleeves 275 fitted over upper, turned down section 270 of rods 258. End or spacer members 280 can be of any suitable cross section having sufficient rigidity. In the embodiment shown, they are of inverted channel shaped cross section with upwardly extending flanges 281 being welded or otherwise secured to sleeves 275 and the upper face of the inverted channel. Main head 276 also includes a channel shaped cross piece 282 which is welded or otherwise secured to end members 280. Cross piece 282 carries a dovetail slide block 283 which in turn supports forming block brackets 284.

Figure 18:
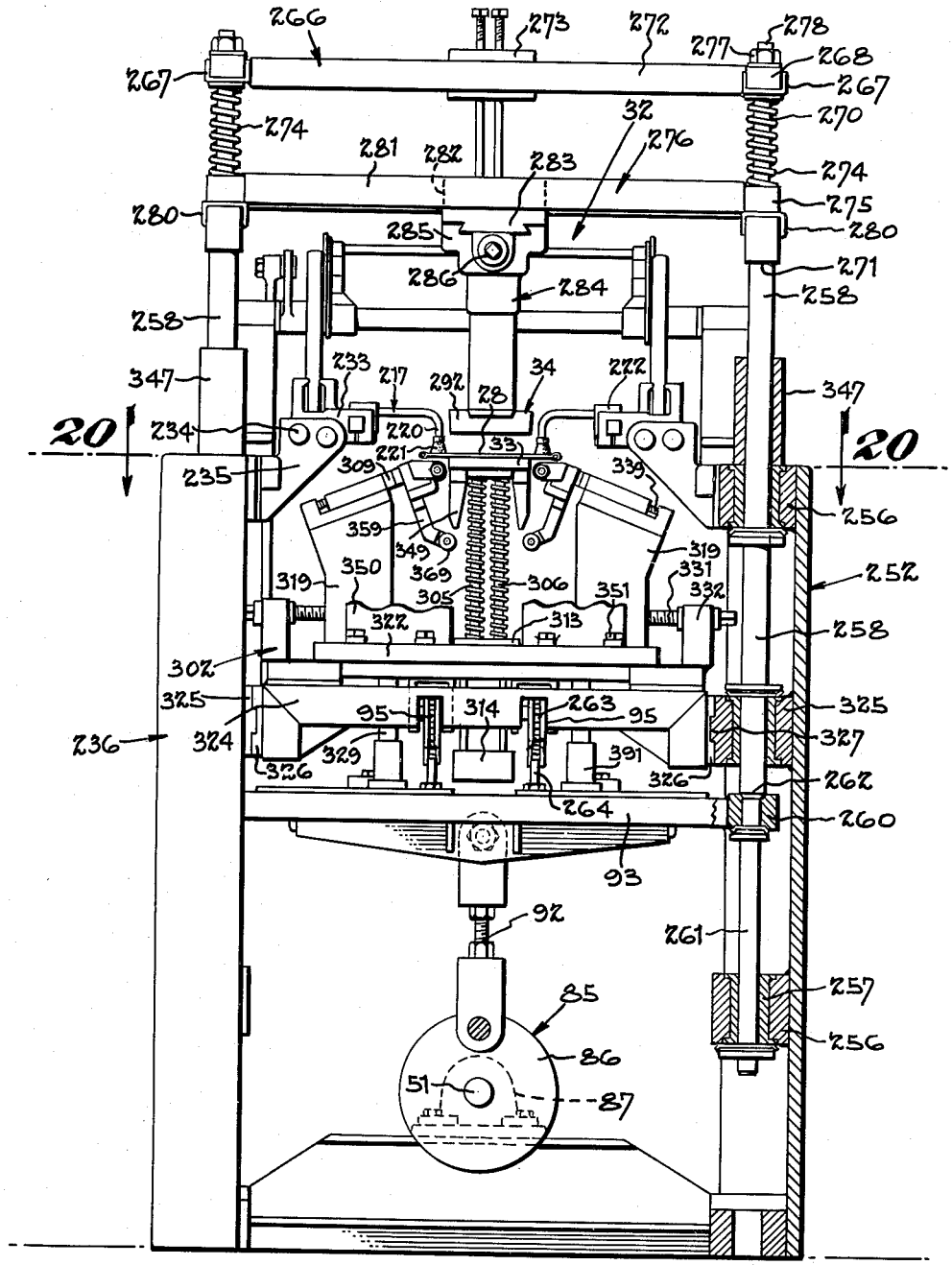
Figure 18 is a simplified end view of the pan folding mechanism.
Figure 19:
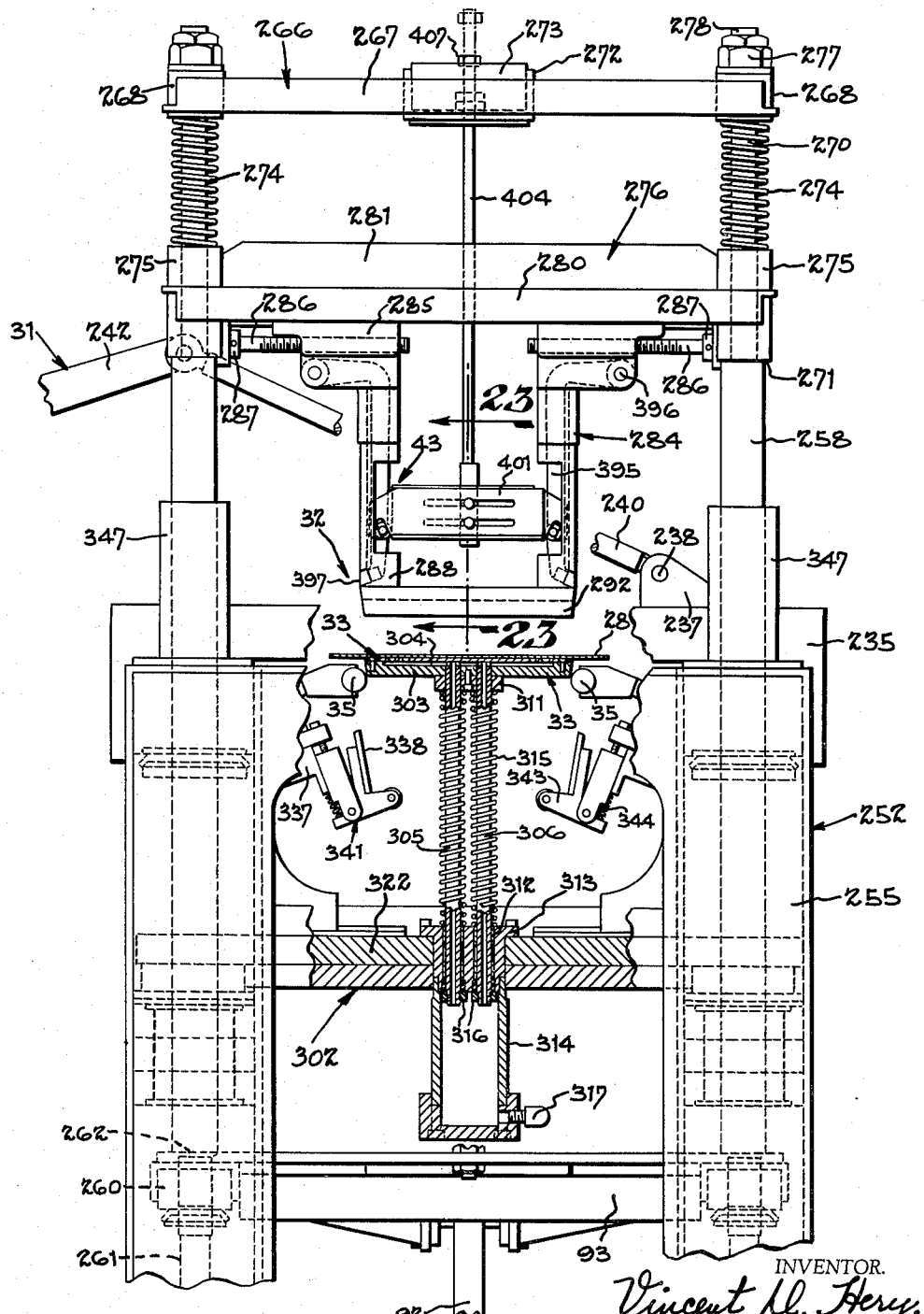
Figure 19 is an enlarged side view of the pan folding mechanism partially in section to show details of construction.

Forming block brackets 284 are best shown in Figures 18, 19 and 22. As there shown, each of the brackets comprises an upper supporting section 285 having a dovetail groove extending longitudinally thereof. Each support portion 285 is provided with a threaded bore extending parallel to the dovetail groove. This threaded bore is adapted to receive an adjusting screw 286 rotably journalled a suitable bearing 287 carried by main head 276. By rotating screw 286, bracket 284 can be adjustably positioned in and out along the dovetail slide-block. The lower end of each of the brackets 284 comprises an inwardly extending mounting foot 288. Foot 288 is provided with a plurality of spaced threaded openings adapted to receive bolts 290 in engagement with counterbored openings 291 in forming block 34, whereby the forming block is rigidly secured to the bottom of brackets 284. Brackets 284 also carry lip folding mechanism 43 as described in detail below.

In the preferred embodiment shown, forming block 34 comprises a lower plate 292 and a peripheral upper plate 293. The plates being held together by means of bolts 290 and together presenting a flat lower surface 294 and a slightly tapered peripheral surface 295 accurately conforming to the bottom, side and end walls of the pan. As best shown in Figure 22, lower plate 292 of forming block 34 is provided with one or more apertures 296 connected to an air pressure line 297. The air line is preferably formed of flexible material and is fitted with a coupling member 298 adapted for threaded engagement with openings 296. As explained in detail below, line 297 is connected to air pressure pump 156 through a cam operated valve 301 effective to control air flow through line 291. Valve 301 includes an arm 425 in engagement with a cam 426 mounted on main shaft 51. Valve 301 causes a blast of air to flow through openings 296 as forming block 34 is separated from support plate 33 at the end of an operating cycle so that formed pans are prevented from adhering to the forming block but rather are forced free of the forming block where they can be ejected from the machine by means of a subsequent blast of air from ejector nozzle 44.

Forming block 34 cooperates with support plate or table 33 upon which blanks 28 are deposited by the transfer mechanism. Support plate 33, primary wall forming mechanism 37 and corner folding mechanisms 41 are supported by a stationary cross frame indicated generally at 302.

Stationary frame 302 comprises two channels 324 supported between mounting blocks 325 carried by corner members 254. In the embodiment shown, channels 324 are provided with end plates 326 having grooves formed therein for engaging guides 327 formed on the mounting blocks. Channels 324 support stationary mounting plate 302, the stationary mounting plate being welded or otherwise secured to the upper surface of the channel members. Stationary plate 302 is provided with a central opening for receiving head 313 of air cylinder 314 and a plurality of spaced openings 328 for receiving actuating rods 329 of the corner folding mechanism. Additionally, stationary plate 302 is provided with transverse rails 330 for guiding adjustable mounting plates 322. Adjustable mounting plates 322 are shifted relative to stationary plate 302 by means of adjusting screws 331 threadably engaging blocks 332 rigidly secured to adjustable plates 322. The outer end of each adjusting screw 331 is rotatably supported in a journal bracket 319.

As best shown in Figures 18 and 19, support table 33 comprises a lower plate 303, the upper surface of which has a central portion 304 removed to provide an air passageway communicating with hollow rods 305 and 306. The periphery of lower plate 303 forms a rim 307 to which a vacuum pad 308 is bolted. Vacuum pad 308 is a metallic plate having a plurality of apertures 310 formed therein, the apertures extending completely through the pad and preferably being enlarged at the outer surface of the pad.

As shown in Figure 22, lower plate 303 of the support table is bolted or otherwise secured to a mounting block 311. This mounting block is in turn permanently secured in any suitable manner to the upper ends of hollow rods 305 and 306. These rods perform the double function of supporting table 33 and providing a fluid connection between vacuum pump 300 and vacuum pad 308.

As best shown in Figure 19, rods 305 and 306 are slidably journalled in bearing sleeves 312 provided in cap member 313 of cylinder 314, cap member 312 being bolted or otherwise secured to stationary mounting plate 302. Rods 305 and 306 extend downwardly into cylinder 314, suitable gasket material being provided for forming a substantially air tight connection between the rods and cylinder. Compression springs 315 are placed over rods 305 and 306 and are compressed between mounting block 311 and cap member 313. These springs are sufficiently strong to normally maintain table 33 in its elevated position as shown in Figure 19. However, springs 315 are weaker than springs 270 so that forming block 34 is effective to force plate 33 downwardly without causing any appreciable compression of springs 270. The lowermost ends of hollow rods 305 and 306 are fitted with stop nuts 316 effective to limit the upward movement of the rods and plate 33. Air cylinder 314 is connected to a vacuum pump 300 through suitable piping 317 and a valve 318. As shown in Figures 29 and 30, valve 318 is a cam actuated valve, having a follower 320 adapted to track upon a cam 321 mounted upon main shaft 51. The valve is opened to apply a vacuum to the cylinder and hence to support plate 33 when block 34 is separated from the plate at the end of the operating cycle. Thus, the suction functions to grasp the pan and prevent its being lifted by the forming block.

Primary wall folding mechanism 37 comprises end rollers 35 and side rollers 36 respectively adapted to engage the end and side margins 40 and 38 of a blank 28 as the blank is forced downwardly past the rollers. Side rollers 36 are elongated rollers preferably formed of hard rubber or the like. These rollers are rotatably journalled in roller mounting brackets 309.

Roller mounting brackets 309 are in turn slidably mounted upon suitable guideways formed in base members 319, the base members being welded or otherwise secured to adjustable mounting plates 322. As best shown in Figure 18, brackets 309 are urged inwardly by means of springs 339, suitable stops (not shown) being provided to limit the movement of these rollers. Means are provided for forcing side rollers 36 outwardly away from the support table and forming block when bead 14 is aligned with rollers. Thus, side rollers 36 function to fold up the side walls of the pan but do not flatten the arcuate beads.

One suitable form of roller shifting means includes depending cam arms 349 extending downwardly from the undersurface of table 33. Arms 349 are adapted for engagement with followers 359 rigidly secured to brackets 309. Followers 359 carry contact rollers 369 disposed below side rollers 36. These contact rollers are cammed outwardly by cam arms 349 when table 33 is lowered a sufficient distance to bring beads 14 into horizontal alignment with side rollers 36. This in turn causes brackets 309 to be shifted outwardly a sufficient distance for the side rollers to clear beads 14.

End rollers 35 are mounted upon brackets 333. These end roller mounting brackets are carried by stationary mounting plate 302, the brackets being shiftable along a dovetail slide formed on the plate by means of an adjusting screw 334 journalled in stationary journal member 332. As best shown in Figure 21, end roller mounting bracket 333 includes an arm 335 slidable within a guideway formed in the mounting bracket and adjustable by means of a fine positioning screw 336. Arm 335 journals divided rollers 35 intermediate the ends of the rollers.

Each of the end roller mounting brackets 333 also carries a second or lower arm 337. This lower arm supports a back-up plate 338 adapted to cooperated with lip folding mechanism 43. More particularly, lower arm 337 is slidably disposed in a suitable guideway formed in the mounting bracket and is adjustably positioned by means of a fine adjusting screw 340. Lower arm 337 carries a depending hanger member 341 which slidably engages bracket 337 and is positioned by means of screw 342. The hanger member pivotally supports a plate carrying member 343. Member 343 mounts a back-up plate 338, as best shown in Figure 22, and is spring urged for limited rotation in a clockwise direction by means of a tension spring 344 which interconnects an extension 345 on member 343 and lower arm 337. Thus, when table 33 and block 34 are lowered, the slight upward and outward taper of support table 33 and forming block 34 causes carrier member 343 to pivot outwardly, in a counterclockwise direction, so that back-up plate 338 rests snugly against the outer surface of the end walls of the pan blank 28 between the fingers of the folding mechanism, as shown in Figure 22. When so positioned, the upper edge 346 of the back-up plate slopes downwardly away from the forming block at a slight angle to permit lip 16 to be folded slightly downwardly by lip folding mechanism 43.

After the blank 28 has been pushed downwardly past rollers 35 and 36 of the primary wall forming mechanism and plate 33 has reached the lower limit of its travel due to the abutment of sleeve 275 with stop collars 347 of corner posts 302, the corner folding mechanism 41 is actuated. Corner folding mechanism 41 is best shown in Figures 20 and 24–28 and comprises four component folders 348. Each of the component folders is disposed adjacent to one corner of the forming block and support table when the plate and table are in their lowermost position. Since each of the four component folders 348 is identical, only one will be described in detail. Each of the component folders 348 comprises a base 350 preferably formed of cast iron or the like. This base is bolted to adjustable mounting plate 322 by means of bolts 351 passing through elongated slots 352 formed in the mounting plate, the slots extending longitudinally of the machine parallel to side rolls 36. Base 350 carries a stationary finger 353 and a movable finger 42 which is pivoted to one end of stationary finger 353 by means of a pin 354.

Stationary finger 353 is rigidly secured in any suitable manner or is formed integral with a horizontally extending flange 355, the flange in turn being mounted upon the upper end of pins 356. These pins are slidably journalled in bearing sleeves 357 fitted in suitable bores in base member 350. Compression springs 358 surround each of the pins 356 and urge fingers 42 and 353 upwardly; upward movement of these fingers being limited by stop nuts 360 threadably engaging the lowermost ends of pins 356. A coil spring 379 is stretched between movable finger 42 and angle shaped bracket 368 for urging the movable finger toward its outer position in which it forms a continuation of the stationary finger, as shown in Figure 27.

Each component corner folding mechanism also includes a finger actuator mechanism indicated generally at 370. This mechanism comprises a pivotally mounted contact arm 371, the free end of which carries a roller 372 rotatably journalled on pin 389 and adapted for engagement with movable finger 42. Arm 371 is pivotally mounted upon a vertical pin 373, the arm being connected by means of a key or the like for movement with a bevel gear 374 which is also mounted on pin 373. As best shown in Figure 25, pin 373 is fitted within a vertical bore 375 formed in base member 350. The pin is vertically positioned in the bore by means of a set screw 376 and is locked in place by means of locking nut 377.

Bevel gear 374 is driven by gear segment 378 pivotally mounted upon pin 380 carried by flange 381. Gear segment 378 is connected or formed integral with an arm 382 pivotally connected to a link 383. The opposite end of link 383 is pivotally mounted upon base 350 as at 384; while the center portion of the link is provided with an opening 385 for receiving a lug or pin 386 carried by actuating rod 329. Actuating rod 329 is slidably journalled in a bracket 388 and bushing 390 carried by base member 350. The rod extends downwardly through an opening 328 in stationary plate 322 and is received within a sleeve 391 bolted or otherwise secured to lower platform 93. A compression spring 392 surrounds the lower portion of rod 329 between nuts 392a threadably engaging the lower end of the rod and an upper inwardly extending shoulder 393 formed on sleeve 391. A second compression spring 387 is compressed between a cap 394 threaded on the upper end of rod 329 and bracket 388.

In operation, as explained in detail later, when the support table 33 and pin forming block 34 reach the lower extreme of their travel, they remain momentarily stationary while lower platform 93 continues to move downwardly. Movement of this platform is effective to cause spring 392 to be compressed against nuts 392a and 394 forcing actuating rod 329 downwardly. Pin 386 carried by this rod causes link 383 to pivot downwardly, in a clockwise direction, in Figure 26. This in turn forces segmental gear 378 in a counterclockwise direction, as viewed in Figure 26. The segmental gear causes arm 371 to pivot inwardly bringing roller 372 into engagement with finger 42 and causing that finger to be pivoted inwardly at right angles to stationary finger 353 so that corner flap 14 is folded inwardly against end wall 12, as shown in Figure 32.

After the corner flaps have been folded inwardly, lip folding mechanism 43 functions to fold end lips 16 outwardly and downwardly. Lip folding mechanism 43 is carried by main head 266. More particularly, the lip folding mechanism comprises depending L shaped pivot arms 395. These arms are mounted adjacent to their upper ends to brackets 285 by means of pins 396. The lower end of each of the arms 395 carries a bar 397 having a lower surface sloping outwardly and downwardly, as best shown in Figure 22. These bars are bolted or otherwise secured to arms 395 in any suitable manner. Arms 395 also carry pins 398 adapted to be received in angularly disposed slots 400 formed in throw plates 401.

Throw plates 401, extend longitudinally relative to table 33, one throw plate being in engagement with each arm 395. The throw plates are adjustably mounted in a slide block 399 as by means of set screws 402 in threaded engagement with the block and passing through elongated slots 403 formed in the throw plates. Slide block 401 is mounted in any suitable manner upon the lower end of rods 404. In the particular embodiment shown in Figure 23, these rods have turned down ends inserted in bores formed in the block, the block being held in place as by means of screws 405. As best seen in Figure 19, rods 404 extend upwardly through suitable openings formed in main head member 266 and also extend upwardly through aligned openings formed in a block 273 carried between cross pieces 272 of the upper head member. The upper ends of rods 404 are threaded to receive adjustable stop nuts 407. These nuts reside within recesses formed in the lower portion of block 273 and are adapted for engagement with the block to cause limited downward movement of rods 404 relative to main head 276.

In operation, when table 33 and forming block 44 are in their lowermost position and corner flaps 14 have been folded against end walls 12 by fingers 42, the outer surface of end wall 12 is engaged by fingers 42 and back up plate 338. Main head member 266 is momentarily held stationary by the abutment of shoulders 271 with stop collars 347. However, lower platform continues to move downwardly as do pull rods 258; the pull rods carry upper head 266 downwardly for a small distance causing rods 404 to be moved downwardly relative to the stationary forming block and arms 395. Downward movement of rods 404 causes upwardly and outwardly extending slots 400 to cam pins 398 outwardly. This in turn forces the lower ends of arms 395 outwardly so that bars 397 engage lips 14 forces them outwardly and downwardly over the upper edges of plates 338 and fingers 42.

*General description of operation*

The manner of operation of the machine and the synchronization of the various component mechanisms can best be understood from a consideration of Figure 35. This figure is a timing diagram indicating the period of operation of various parts of the machine. The horizontal axis of the chart shows the degrees of one complete revolution of the drive shaft which represents one cycle of operation and the production of one pan.

In initially setting up the machine, the spacing between opposite sheet beading rolls is adjusted to accommodate the proper width of foil sheet. This is accomplished by turning adjustment screws 111 to shift side frame members 114 outwardly along guidewise cross rails 116. It will be appreciated that before the beading rollers are positioned, side frame members 114 and 115 are separated a sufficient distance to allow sleeves of the proper length to be placed over collars 128. When the side members are brought together, these sleeves are tightly clamped between the collars and rotate the collars on roller bearings 130.

The next step in setting up the machine is to adjust the beading and notching mechanism relative to the cutoff knife in accordance with the desired pan length. Since the pans are cut transversely through the notched portion, notching die 21 must be spaced an integral number of pan lengths from cutoff blade 27 of the notching mechanism. This is accomplished by turning adjusting screw 111 to shift secondary slide 104 along ways 110 of main slide 105.

The length of sheet fed to the cutoff mechanism 26 is adjusted by rotating screw 178 carried by disc 179. This varies the throw of rack 177 and controls the amount of rotation of feed roll 25 during each rotation of disc 179.

Next, the position of cutoff blade 27 must be adjusted relative to the extreme left hand position of the vacuum fingers 30 of the transfer mechanism so that the fingers will engage the sheet in such a manner that it will be centered longitudinally on table 33 when it is deposited on the table by the transfer mechanism. In other words, the stroke and positioning of the transfer mechanism remain the same for all sizes of pans. However, as the pan length is increased, cutoff blade 27 is shifted toward the forward end of the machine by an amount equal to one-half of the increase in pan length. Fingers 30 thus engage the severed sheet on table 216 at points shifted rearwardly along the sheet and the longitudinal center line of the sheet is not changed relative to the fingers.

In setting up pan folding mechanism 32, a forming block 34 of the proper size is first bolted to brackets 284. Similarly, a lower plate 303 and vacuum pad 308 of table 33 are bolted to block 311. Thereafter, bars 397 of the proper width are bolted to arms 395. The throw of these arms is adjusted by shifting slide plates 401 in or out relative to rods 404 and block 399. It is also necessary to replace end rolls 35 with end rolls of the proper width. Backup plates 338 are also replaced with backup plates of the proper width.

After these changes have been made, table 33 and forming block 34 are lowered by turning hand crank 101. When the forming block and table are aligned with the rollers, the spacing of side rollers 36 and the transverse spacing of component corner folding mechanisms 348 is adjusted. Side rollers 36 are preferably longer than the maximum length of pan to be produced on the machine so that these rollers need not be replaced when producing pans of varying lengths. The transverse spacing of the side rollers and component corner folders is effected by setting adjustable mounting plates 322 relative to stationary mounting plate 302. Adjustable mounting plates 322 are shifted along cross-rails 330 by turning adjustment screws 331 until the side rollers engage the sides of the forming block.

The corner folders are next shifted longitudinally and secured in their proper position by tightening bolts 351. End rollers 35 are shifted inwardly until they abut the ends of forming block 34 by rotating adjusting screws 334. To finish readying the machine for operation, a sheet 17 is inserted through the rollers of bead forming mechanism 18 and is drawn between feed rollers of the feeding mechanism.

At the start of the cycle of operation, feed roller 25 is rotated in a forward direction through a drive including rack 177, disc 179, transverse shaft 72, right angle gear unit 71, splined shaft 78, chain 63 and main shaft 51. As indicated in Figure 38, drive roller 25 is advanced during the first half of the operating cycle. During this length of time, a length of sheet 17 precisely equal to the desired length of blank 28 is drawn through the rollers of beading mechanism 18 and is fed to cutoff mechanism 26.

As the sheet is drawn through the beading mechanism, upper and lower confining rollers 122 and 123 respectively engage the upper and lower surfaces of the sheet and prevent it from crumpling as the edges of the sheet are progressively beaded by engagement with the peripheral grooves formed in beading rollers 124. This beading action is best shown in Figure 37. The rollers of the beading mechanism are freely rotatable and impose no appreciable drag on the sheet. Moreover, the opposed beading rollers form relative rigid beads on the sheet which provides means for readily centering sheet transversely of the machine as it emerges from the final beading rollers.

After the feeding rolls stop and sheet 17 is stationary, cutoff blade 27 is lowered to shear the sheet along a transverse line. At substantially the same time, notching punches 147 are lowered in response to the actuation of solenoid valve 158. The notching punches enter die blocks 21 forming notches 23 in strip 17.

During the time that the blank is being advanced, notched and severed, the transfer mechanism is retracted to pickup the severed sheet. Specifically, at the beginning of a cycle vacuum fingers 30 of the transfer mechanism have picked-up the sheet severed during the previous cycle from platform 216 and have transferred the sheet to a position over table 33 where the transfer fingers hold the blank until it is clamped between table 33 and forming block 34. Thereafter, the vacuum fingers of the transfer mechanism are returned toward the forward end of the machine and reach a station over platform 216 shortly after the blank has been severed by the cutoff blade. Thereafter, the transfer fingers are again shifted toward the support plate and forming block.

At the beginning of the cycle, the lower platform is raised and the forming block is spaced from table 33. This lower platform 93 is lowered during the first half cycle and is raised during the second half cycle. As lower platform 93 is driven downwardly through connecting arm 92, pull rods 258 are shifted downwardly carrying with them upper head member 266 and main head 276. As main head 276 is lowered, forming block 34 is forced against table 33 (at approximately 57° in the embodiment shown). At the same time, the vacuum in fingers 30 is relieved, releasing blank 28.

Continued downward movement of the main head causes forming block 34 to press table 33 downwardly so that the peripheral edges of blank 28 are contacted by side rollers 36 and end rollers 35 which fold the side and end walls of the sheet upwardly. Just before beads 14 are brought into contact with side rollers 36, depending cam arms 349 engage follower rollers 369, forcing side roller brackets 309 away from the forming block so that side rollers 36 do not engage beads 14.

After passing downwardly beyond rollers 35 and 36, the lower surface of the forming plate engages flanges 355 of the corner folders so that stationary fingers 353 and movable finger 42 are shifted downwardly with the table and forming block and are automatically properly positioned to fold corners 15. At approximately 126°, sleeves 275 on main head 276 abut stop collar 347 so that the main head, forming block and table remain stationary in their lowermost position. These members remain stationary for approximately 108°.

However, after main head member 276 is stopped, lower platform 93 continues to descend for approximately 54°. As lower platform 93 continues to descend, sleeves 391 compress springs 387 against nuts 394 carried by rods 329, whereby the rods are drawn downwardly forcing movable fingers 42 inwardly to bend flaps 15 against the end walls of the pan. This action is completed at approximately 156° and the movable fingers 42 are held in their inner position for approximately 47°.

As the lower platform continues downwardly, pull rods 258 also move downwardly carrying with them upper head member 266. Downward movement of this head member causes block 273 to engage nuts 407 forcing rods 404 downwardly and causing slide blocks 401 to cam arms 395 and bars 397 outwardly to fold lips 16 outwardly and downwardly over the upper edges of movable fingers 42 and backup plates 338.

As lower platform 93 starts to rise, pull rods 258 are shifted upwardly raising upper head member 266. Rods 404 are thus shifted upwardly retracting folding bars 297. At the same time, the tension in springs 392 compressed by sleeves 394 is released, so that rods 329 are lifted by the action of springs 387 and movable fingers 42 are retracted by springs 379.

As main head 276 rises, forming block 34 and table 33 rise carrying the blank upwardly past end rollers 35. These rollers engage downwardly and outwardly folded lips 16 and function to fold the lips flat against the end walls of the pan over flaps 15. At 303°, table 33 reaches the upper limit of its travel while block 34 continues to move upwardly. Shortly before this time, a suction is applied to pad 292 and pressure is applied through openings 296 in the forming block. The combination of pressure and suction causes the pan to remain on the table. Finally the pan is ejected onto a discharge table by a blast of air from nozzle 44 which is connected to pump 156 through a valve 423. This valve includes an arm 424 carrying a roller 427 which tracks upon cam 428 rotated with main shaft 51. This completes the operating cycle.

Having described my invention, I claim:

1. A machine for forming a folded container, said machine comprising means adapted to receive a notched, rectangular blank and to convey said blank to a support plate, means for shifting said support plate in a vertical plane, first means for initially engaging said blank as it is carried downwardly on said plate for bending said blank to form upstanding side and end walls and folded corner flaps interconnecting said side and end walls and extending outwardly beyond said end walls parallel to said side walls, second means disposed below said first means for engagement with said blank subsequent to its engagement with said first means for folding said corner flaps against said end walls, and third means for overfolding the upper edge of each of said end walls outwardly, said upper edges being engaged by said first means upon upper movement of said plate whereby said upper edges are folded downwardly over said flaps.

2. A machine for forming a folded container, said machine comprising a movable support plate, means adapted to receive a notched rectangular blank and to deposit said blank upon said support plate, a forming block mounted above said support plate, means for bringing said forming block into engagement with said support plate whereby said blank is clamped between the support plate and forming block, means for shifting said forming block and support plate in a vertical plane, primary wall forming means for engaging the marginal portions of said blank as said forming block moves downwardly, said primary wall forming means being effective to bend said marginal edges of the blank upwardly to form upstanding side and end walls and corner flaps interconnecting the side and end walls and extending outwardly beyond the end walls parallel to the side walls, a corner folding mechanism disposed beneath said primary wall forming mechanism and engageable with said flaps after said blank has become disengaged from said primary wall forming means, said corner folding mechanism being effective to fold said corner flaps inwardly against said end walls, and lip folding means disposed beneath said primary wall forming means and actuated after the actuation of said corner folding mechanism to fold the upper portions of said end walls outwardly over said flaps, said folded upper portions being engaged by said primary wall forming means and folded downwardly upon return movement of said forming block.

3. In a machine for forming a folded container from a strip of sheet material, said machine comprising means for forming spaced notches in the side edges of said strip, means for severing predetermined lengths of strip to form notched rectangular blanks, a support plate, means for transferring said blank from said severing means to said support plate, and means for aligning said strip of sheet material transversely relative to said machine, said means comprising a plurality of longitudinally spaced beading rollers disposed on opposite sides of said sheet for forming arcuate beads on the edges of said sheet, and means for shifting said beading rollers transversely of said machine.

4. A machine for forming a folded container from a strip of sheet material, said machine comprising means for severing a predetermined length of said strip to form a rectangular blank, a support plate, means for transferring said blank from said severing means to said support plate and for depositing said blank upon said support plate, said last named means comprising vacuum fingers, means for reciprocating said vacuum fingers longitudinally of said machine along a fixed path, and centering means for causing said vacuum fingers to deposit said sheet in a predetermined position longitudinally of said support plate, said centering means comprising means for shifting said severing means relative to said transfer means.

5. A machine for forming a folded container from a strip of sheet material, said machine, a main slide, a second slide carried by said main slide, a notching mechanism carried by said second slide, for forming notches in said strip, a cut off mechanism carried by said first slide for severing said strip to form a notched rectangular blank, a feed mechanism carried by said first slide for feeding predetermined lengths of material to said cut off mechanism, means for transferring said severed blank to a support plate and for depositing said blank upon said support plate, said last named means comprising vacuum fingers and means for reciprocating said vacuum fingers longitudinally of said machine along a fixed path, and centering means for causing said vacuum fingers to deposit said sheet in a predetermined position longitudinally of said support plate, said centering means comprising means for shifting said main slide longitudinally relative to said transfer means.

6. In a machine for forming a folded container from a strip of sheet material, the combination of means for severing a predetermined length of strip to form a rectangular blank, a support plate adapted to receive said blank, a forming block adapted to engage said support plate, a folding mechanism adapted to engage said blank as it is shifted upon said support plate, and means for transferring a blank from said severing means to the support plate, said last named means comprising spaced longitudinally extending guide rods, members slidably engaging each of said guide rods, an arm carried by each of said members, a depending vacuum finger carried by each of said arms, said vacuum fingers being adapted to engage one of said blanks, means for applying a vacuum to said fingers, whereby said fingers pick up said blank, means for shifting said members along said guide rods to bring said vacuum fingers into alignment with said support table, means for maintaining a vacuum in said fingers until said forming block engages said blank, thereafter releasing said vacuum.

7. In a machine for forming a folded container from a strip of sheet material, the combination of means for severing a predetermined length of strip to form a rectangular blank, a support plate adapted to receive said blank, a forming block adapted to engage said support plate, a folding mechanism adapted to engage said blank as it is shifted upon said support plate, and means for transferring a blank from said severing means to the support plate, said last named means comprising spaced longitudinally extending guide rods, members slidably engaging each of said guide rods, an arm carried by each of said members, a depending vacuum finger carried by each of said arms, said vacuum fingers being adapted to engage one of said blanks, means for applying a vacuum to said fingers, whereby said fingers pick up said blank, means for shifting said members along said guide rods to bring said vacuum fingers into alignment with said support table, means for maintaining a vacuum in said fingers until said forming block engages said blank, thereafter releasing said vacuum, each of said arms having a downwardly movable portion, spring means normally urging said downwardly movable portion upwardly, whereby said arms are adapted to be shifted downwardly to bring said blank into contact with said support plate while said blank is held by said vacuum fingers.

8. In a machine for forming a folded container from a strip of sheet material, the combination of means for delivering a notched rectangular blank, a support plate adapted to receive said blank, spring means mounting said support plate for vertical movement, said spring means normally urging said support plate upwardly, a lower platform, driving means for raising and lowering said lower platform, a main head member disposed above said lower platform, means mechanically interconnecting said main head member and said lower platform, said driving means being effective to permit relative downward movement of said lower platform after said main head member has reached its lowermost position, a forming block carried by said main head member, said forming block being forced downwardly into engagement with said support plate when said main head member is lowered and being effective to force the support plate downwardly against said spring means, a primary wall forming mechanism comprising rotatable rollers mounted for engagement with the blank for forcing portions of the blank against the sides and ends of said forming block when said block is lowered thereby forming the side and end walls of said pan, and corner flaps interconnecting the side and end walls, a corner folding mechanism comprising movable fingers adapted to engage said corner flaps and fold them inwardly against said forming block, and means carried by said lower platform for actuating said corner folding mechanism during the period when said lower platform is moving downwardly relative to said main head member.

9. In a machine for forming a folded container from a strip of sheet material, the combination of means for delivering a notched rectangular blank, a support plate adapted to receive said blank, spring means mounting said support plate for vertical movement, said spring means normally urging said support plate upwardly, a lower platform, driving means for raising and lowering said lower platform, a main head member disposed above said lower platform, means mechanically interconnecting said main head member and said lower platform, said driving means being effective to permit relative downward movement of said lower platform after said main head member has reached its lowermost position, a forming block carried by said main head member, said forming block being forced downwardly into engagement with said support plate when said main head member is lowered and being effective to force the support plate downwardly against said spring means, a primary wall forming mechanism comprising rotatable rollers mounted for engagement with the blank for forcing portions of the blank against the sides and ends of said forming block when said block is lowered thereby forming the side and end walls of said pan, and corner flaps interconnecting the side and end walls, a corner folding mechanism comprising movable fingers adapted to engage said corner flaps and fold them inwardly against said forming block, and means carried by said lower platform for actuating said corner folding mechanism during the period when said lower platform is moving downwardly relative to said main head member, and a lip folding mechanism adapted to fold the upper edges of said side walls outwardly over said flaps, and means for actuating said lip folding mechanism subsequent to the actuation of said corner folding mechanism but prior to return movement of said forming block.

10. In a machine for forming a folded container from a strip of sheet material, the combination of means for delivering a notched rectangular blank, a support plate adapted to receive said blank, spring means yieldably mounting said support plate for vertical movement, said spring means normally urging said support plate upwardly, a lower platform, driving means for raising and lowering said lower platform, a main head member, means mechanically interconnecting said main head member and said lower platform, said driving means being effective to permit relative downward movement of said lower platform after said main head member has reached its lowermost position, a forming block carried by said main head member, said forming block being forced downwardly into engagement with said support plate when said main head member is lowered, and being effective to force said support plate downwardly against said spring means, a primary wall forming mechanism comprising rotatable rollers mounted for engagement with a blank to force portions of it against the sides and ends of said forming block when said block is lowered, thereby forming side and end walls and corner flaps on said blank, said forming block remaining stationary momentarily in its lowermost position, a corner folding mechanism comprising movable fingers adapted to engage said corner flaps and fold them inwardly against said forming block, means carried by said lower platform for actuating said fingers when said block is stationary in its lowermost position.

11. In a machine for forming a folded container from a strip of sheet material, the combination of means for delivering a notched rectangular blank, a support plate adapted to receive said blank, spring means yieldably mounting said support plate for vertical movement, said spring means normally urging said support plate upwardly, a lower platform, driving means for raising and lowering said lower platform, a main head member, means mechanically interconnecting said main head member and said lower platform, said driving means being effective to permit relative downward movement of said lower platform after said main head member has reached its lowermost position, a forming block carried by said main head member, said forming block being forced downwardly into engagement with said support plate when said main head member is lowered, and being effective to force said support plate downwardly against said spring means, a primary wall forming mechanism comprising rotatable rollers mounted for engagement with a blank to force portions of it against the sides and ends of said forming block when said block is lowered, said forming block remaining stationary momentarily in its lowermost position, a corner folding mechanism comprising movable fingers adapted to engage said corner flaps and fold them inwardly against said forming block, means carried by said lower platform for actuating said fingers when said block is stationary in its lowermost position, and a lip folding mechanism adapted to fold the upper portions of the side walls outwardly over said flaps, said upper portions being engaged by said rollers when said forming block moves upwardly, whereby said portions are folded flat against said end walls.

12. A pan folding mechanism adapted to fold a blank of material into a pan having a bottom and upstanding side and end walls, said machine comprising a frame, journal members carried by said frame, a plurality of vertical pull rods slidably supported in said journal members, a lower plate in engagement with the lower ends of said rods, means mounting said lower plate for vertical reciprocating movements, power means for raising and lowering said plate, an upper head member mounted upon the upper end of said rods, a main head member carried by said rods below said upper head member, said main head member being mounted for limited movement along said rods, spring means for urging said main head member downwardly along said rods, stops carried by said rods for limiting downward movement of said main head member, a stationary cross frame, a support plate, means carried by said cross frame for mounting said support plate for limited vertical movement, spring means for urging said support plate upwardly away from said cross frame, a forming block carried by said main head member and adapted upon downward movement of said member to be brought into engagement with said support plate, side and end rollers supported by said cross member and respectively disposed to engage the side and end walls of said forming block when said forming block forces said support plate downwardly, a plurality of component corner folder mechanisms carried by said cross frame beneath said rollers, each of said component corner folders including a pivotally mounted finger adapted to be pivoted into engagement with said forming block, an actuating linkage for each of said component corner folder mechanisms, said actuating linkage including a rod having a lower end interconnected with said lower platform, and an upper end interconnected with said movable finger, a lip folding mechanism including bars adapted to be shifted outwardly over the end walls of said forming block, an actuating means for shifting said bars, said actuating means comprising camming means associated with said bars, and rods for actuating said camming means, said rods being adapted to engage said upper head member and to be forced downwardly thereby.

13. A pan folding mechanism adapted to fold a blank of material into a pan having a bottom and upstanding side and end walls, said machine comprising a frame, journal members carried by said frame, a plurality of vertical pull rods slidably supported in said journal members, a lower plate in engagement with the lower ends of said rods, means mounting said lower plate for vertical reciprocating movements, power means for raising and lowering said plate, an upper head member mounted upon the upper end of said rods, a main head member carried by said rods below said upper head member, said main head member being mounted for limited movement along said rods, spring means for urging said main head member downwardly along said rods, stops carried by said rods for limiting downward movement of said main head member, a stationary cross frame, a support plate, means carried by said cross frame for mounting said support plate for limited vertical movement, spring means for urging said support plate upwardly away from said cross frame, a forming block carried by said main head member and adapted upon downward movement of said member to be brought into engagement with said support plate, side and end rollers supported by said cross member and respectively disposed to engage the side and end walls of said forming block when said forming block forces said support plate downwardly, a plurality of component corner folder mechanisms carried by said cross frame beneath said rollers, each of said component corner folders including a pivotally mounted finger adapted to be pivoted into engagement with said forming block, an actuating linkage for each of said component corner folder mechanisms, said actuating linkage including a rod having a lower end interconnected with said lower platform, and an upper end interconnected with said movable finger, a lip folding mechanism including bars adapted to be shifted outwardly over the end walls of said forming block, an actuating means for shifting said bars, said actuating means comprising camming means associated with said bars, and rods for actuating said camming means, said rods being adapted to engage said upper head member and to be forced downwardly thereby, and means for forcing said side rollers away from said forming block when a predetermined portion of said block is aligned with said rollers, said last named means comprising depending cam arms carried by said support plate, and followers connected with said side rollers.

14. A machine for forming a folded container, said machine comprising a support plate, means adapted to receive a rectangular blank having beaded side edges and to deposit said blank upon said support plate, a forming block mounted above said support plate, means for bringing said forming block into engagement with said support plate, whereby said blank is clamped between the support plate and forming block, means for shifting said forming block and support plate in a vertical plane, side and end rollers respectively adapted to engage the side and endwise marginal portions of said blank as said forming block moves downwardly, said rollers being effective to bend said marginal edges of the blank upwardly to form upstanding side and end walls, and means for forcing said side rollers away from said forming block when said beads are aligned with said side rollers.

15. A machine for forming a folded container, said machine comprising a support plate, means adapted to receive a rectangular blank and to deposit said blank upon said support plate, a forming block mounted above said support plate, means for bringing said forming block into engagement with said support plate, whereby said blank is clamped between the support plate and forming block, means for shifting said forming block and support plate downwardly in a vertical plane, side and end rollers for respectively engaging the side and end marginal portions of said blank as said forming block moves downwardly, said rollers being effective to bend said marginal edges of the blank upwardly to form upstanding side and end walls and folded corner flaps interconnecting the side and end walls and extending outwardly beyond said end walls parallel to said side walls, means disposed below said side and end rolls for folding said corner flaps against said end walls, means disposed below said side and end rolls for folding the upper edge of said side walls outwardly over said flaps to form lips, said lips engaging said end rolls on upward movement of said forming block whereby said end rolls fold said lips downwardly against said flaps.

16. A machine for forming a folded container, said machine comprising a support plate, means adapted to receive a rectangular blank and to deposit said blank upon said support plate, a forming block mounted above said support plate, means for bringing said forming block into engagement with said support plate, whereby said blank is clamped between the support plate and forming block, means for shifting said forming block and support plate in a vertical plane, side and end rollers for respectively engaging the side and end marginal portions of said blank as said forming block moves downwardly, said rollers being effective to bend said marginal edges of the blank upwardly to form upstanding side and end walls and folded corner flaps interconnecting the side and end walls, means for folding said corner flaps against said end walls, means for folding the upper edge of said side walls outwardly over said flaps to form lips, said lips engaging said end rolls on upward movement of said forming block whereby said end rolls fold said lips downwardly against said flaps, and means for discharging finished pans from said machine, said means comprising air pressure means including openings in said forming block, and air vacuum means including openings in said support plate.

17. A machine for forming a folded container, said machine comprising a support plate, means adapted to receive a rectangular blank and to deposit said blank upon said support plate, a forming block mounted above said support plate, means for bringing said forming block into engagement with said support plate, whereby said blank is clamped between the support plate and forming block, means for shifting said forming block and support plate in a vertical plane, side and end rollers for respectively engaging the side and end marginal portions of said blank as said forming block moves downwardly, said rollers being effective to bend said marginal edges of the blank upwardly to form upstanding side and end walls and folded corner flaps interconnecting the side and end walls, means for folding said corner flaps against said end walls, means for folding the upper edge of said side walls outwardly over said flaps to form lips, said lips engaging said end rolls on upward movement of said forming block whereby said end rolls fold said lips downwardly against said flaps, and means for discharging finished pans from said machine, said means comprising air pressure means including openings in said forming block, and air vacuum means including openings in said support plate, and an air discharge nozzle disposed adjacent to said support table and means supplying air to said nozzle.

18. A pan folding mechanism adapted to fold a blank of material into a pan having a bottom and upstanding side and end walls, said machine comprising a frame, a plurality of vertical pull rods slidably supported by said frame, a lower plate in engagement with the lower ends of said pull rods, power means for raising and lowering said plate, a main head member mounted upon the upper portion of said rods, said main head member being mounted for limited movement along said rods, spring means for urging said main head member downwardly along said rods, a stationary cross frame, a support plate, means carried by said cross frame for mounting said support plate for veritcal movement, spring means for urging said support plate upwardly away from said cross frame, a forming block carried by said main head member and adapted upon downward movement of said member to be brought into engagement with said support plate, a plurality of rollers mounted upon said cross member and disposed to engage the side and end walls of said forming block when said forming block and said support plate are shifted downwardly, a plurality of component corner folder mechanisms carried by said cross frame beneath said rollers, each of said component corner folders including a pivotally mounted finger adapted to be pivoted into engagement with said forming block, an actuating linkage for each of said component corner folding mechanisms, said actuating linkage including a rod interconnected with said lower platform.

19. A pan folding mechanism adapted to fold a blank of material into a pan having a bottom and upstanding side and end walls, said machine comprising a frame, a plurality of vertical pull rods slidably supported by said frame, a lower plate in engagement with the lower ends of said pull rods, power means for raising and lowering said plate, a main head member mounted upon the upper portion of said rods, said main head member being mounted for limited movement along said rods, spring means for urging said main head member downwardly along said rods, a stationary cross frame, a support plate, means carried by said cross frame for mounting said support plate for vertical movement, spring means for urging said support plate upwardly away from said cross frame, a forming block carried by said main head member and adapted upon downward movement of said member to be brought into engagement with said support plate, a plurality of rollers mounted upon said cross member and disposed to engage the side and end walls of said forming block when said forming block and said support plate are shifted downwardly, a plurality of component corner folder mechanisms carried by said cross frame beneath said rollers, each of said component corner folders including a pivotally mounted finger adapted to be pivoted into engagement with said forming block, an actuating linkage for each of said component corner folding mechanisms, said actuating linkage including a rod interconnected with said lower platform, and a lip folding mechanism including bars adapted to be shifted outwardly over the end walls of said forming block, an actuating means for shifting said bars after said component corner folders have been actuated.

20. In a machine for forming a folded container from a strip of material, a forming block having a lower face, side and end walls, means for clamping a blank of material against the lower face of said forming block, means for moving said forming block vertically, means for engaging marginal portions of said blank when said forming block is shifted vertically to fold the marginal portions of said blank against the side and end walls of said forming block to form the end and side walls and corner flaps of said pan, means for folding said corner flaps inwardly, said means comprising four component folders, one of said folders being disposed at each corner of said forming block, each of said component corner folders comprising a fixed finger, a movable finger, spring means urging said movable finger away from said forming block and means for forcing said movable finger toward said block.

21. In a machine for forming a folded container from a strip of material, a forming block having a lower face, side and end walls, a support plate mounted beneath said forming block for clamping a blank of material against the lower face of said forming block, means for moving said forming block vertically, means for engaging marginal portions of said blank when said forming block is shifted vertically to fold the marginal portions of said blank against the side and end walls of said forming block to form the end and side walls and corner flaps of said pan, means for folding said corner flaps inwardly, said means comprising four component folders, one of said folders being disposed at each corner of said forming block, each of said component corner folders comprising a fixed finger, a movable finger pivotally secured to said fixed finger, spring means urging said movable finger away from said forming block, an actuating means for forcing said movable finger toward said block when said block is in its lowermost position.

22. In a machine for forming a folded container from a strip of material, a forming block having a lower face, side and end walls, a support plate mounted beneath said forming block for clamping a blank of material against the lower face of said forming block, means for moving said forming block vertically, means for engaging marginal portions of said blank when said forming block is shifted vertically to fold the marginal portions of said blank against the side and end walls of said forming block to form the end and side walls and corner flaps of said pan, means for folding said corner flaps inwardly, said means comprising four component folders, one of said folders being disposed at each corner of said forming block, each of said component corner folders comprising a fixed finger, a movable finger pivotally secured to said fixed finger, spring means urging said movable finger away from said forming block, an actuating means for forcing said movable finger toward said block when said block is in its lowermost position, said fixed finger and movable finger being mounted for limited vertical movement, spring means urging said fingers upwardly, and abutment means carried by said fixed finger for engagement with said support plate.

23. In a machine for forming a folded container from a strip of material, a forming block having a lower face, side and end walls, means for clamping a blank of material against the lower face of said forming block, means for moving said forming block vertically, said means being effective to momentarily hold the forming block in its lowermost position, means for engaging marginal portions of said blank when said forming block is shifted vertically to fold the marginal portions of said blank against the side and end walls of said forming block to form the end and side walls and corner flaps of said pan, means for folding said corner flaps inwardly, said means comprising four component folders, one of said folders being disposed at each corner of said forming block, each of said component corner folders comprising a fixed finger, a movable finger, spring means urging said movable finger away from said forming block, an actuating mechanism for forcing said movable finger toward said block when said block is stationary in its lowermost position, said mechanism being interconnected with the means for moving the forming block vertically.

24. In a machine for forming a folded container from a strip of material, a lower platform, a plurality of pull rods, movable vertically with the lower platform, a main head member slidably mounted upon said pull rods, a forming block carried by said main head member, a forming block having a lower face, side and end walls, means for clamping a blank of material against the lower face of said forming block, means for moving said lower plate vertically, means for engaging marginal portions of said blank when said forming block is shifted vertically to fold the marginal portions of said blank against the side and end walls of said forming block to form the end and side walls and corner flaps of said pan, means for folding said corner flaps inwardly, said means comprising four component folders disposed at each corner of said forming block, each of said component corner folders comprising a fixed finger, a movable finger, spring means urging said movable finger away from said forming block and means for forcing said movable finger toward said block, said last named means including a link connected to said lower platform and gear means interconnecting said link and said movable finger, whereby said movable finger is shifted when said lower platform is shifted relative to the forming block.

25. In a machine for forming folded containers having a bottom, upstanding side and end walls, corner flaps interconnecting said walls and lips formed on the end walls, said lips being folded downwardly over said corner flaps, the combination of a forming block having a bottom, side and end walls, a main head mounting said forming block, an upper head mounted above said main head, means for vertically reciprocating said upper head, spring means interconnecting said upper head and main head, means limiting downward movement of said lower head, whereby said upper head moves downwardly relative to said upper head when downward movement of said upper head is limited, means for engaging the marginal portions of said blank as the forming block moves downwardly, said means being effective to bend the endwise marginal portions of said sheet upwardly against said forming block to form upstanding side walls, and means for bending the upper edges of said end walls outwardly, said means comprising arms depending from said main head, for swinging movement outwardly over said forming block.

26. In a machine for forming folded containers having a bottom, upstanding side and end walls, corner flaps interconnecting said walls and lips formed on the end walls, said lips being folded downwardly over said corner flaps, the combination of a forming block having a bottom, side and end walls, a main head mounting said forming block, an upper head mounted above said main head, means for vertically reciprocating said upper head, spring means interconnecting said upper head and main head, means limiting downward movement of said lower head, whereby said upper head moves downwardly relative to said upper head when downward movement of said upper head is limited, means for engaging the marginal portions of said blank as the forming block moves downwardly, said means being effective to bend the endwise marginal portions of said sheet upwardly against said forming block to form upstanding side walls, and means for bending the upper edges of said end walls outwardly, said means comprising arms depending from said main head, for swinging movement outwardly over said forming block, and means interconnecting said arms and said upper head and adapted to force said arms outwardly when the upper head is moved relative to said main head.

27. In a machine for forming folded containers having a bottom, upstanding side and end walls, corner flaps interconnecting said walls and lips formed on the end walls, said lips being folded downwardly over said corner flaps, the combination of a forming block having a bottom, side and end walls, a main head mounting said forming block, an upper head mounted above said main head, means for vertically reciprocating said upper head, spring means interconnecting said upper head and main head, means limiting downward movement of said lower head, whereby said upper head moves downwardly relative to said upper head when downward movement of said upper head is limited, means for engaging the marginal portions of said blank as the forming block moves downwardly, said means being effective to bend the endwise marginal portions of said sheet upwardly against said forming block to form upstanding side walls, and means for bending the upper edges of said end walls outwardly, said means comprising arms depending from said main head, for swinging movement outwardly over said forming block, a pin formed on each of said arms, cam plates, each of said cam plates having an angulated slot formed therein for receiving one of said pins, rods mounting said cam plates, said rods being adapted for engagement with said upper head member, whereby said rods force said cam plates downwardly and said arms are shifted outwardly when said upper head member is shifted relative to said member.

References Cited in the file of this patent

UNITED STATES PATENTS

| | | |
|---|---|---|
| 101,354 | Crosby | Mar. 29, 1870 |
| 841,838 | Williams | Jan. 22, 1907 |
| 995,604 | Keagy | June 20, 1911 |
| 1,384,278 | Slocombe | July 12, 1921 |
| 1,908,823 | Daniell | May 16, 1933 |
| 2,016,562 | Schmidtke | Oct. 8, 1935 |
| 2,087,437 | Knight | July 20, 1937 |
| 2,180,748 | Lidebotham | Nov. 21, 1939 |
| 2,350,874 | Buxbaum | June 6, 1944 |
| 2,438,788 | Palmer | Mar. 30, 1948 |
| 2,624,248 | Baker et al. | Jan. 6, 1953 |
| 2,848,926 | Gschwind et al. | Aug. 26, 1958 |